United States Patent [19]
Mizuuchi et al.

[11] Patent Number: 5,357,533
[45] Date of Patent: Oct. 18, 1994

[54] FREQUENCY DOUBLER AND LASER SOURCE

[75] Inventors: Kiminori Mizuuchi, Neyagawa; Kazuhisa Yamamoto, Settsu; Makoto Kato, Nishinomiya; Hisanao Sato, Ibaraki; Hiroaki Yamamoto, Katano, all of Japan

[73] Assignee: Matsushita Electric Industrial Co., Ltd., Osaka, Japan

[21] Appl. No.: 35,957

[22] Filed: Mar. 23, 1993

[30] Foreign Application Priority Data

Mar. 27, 1992 [JP] Japan ................... 4-070726

[51] Int. Cl.$^5$ ............................. H01S 3/10
[52] U.S. Cl. ...................... 372/22; 372/21; 359/328
[58] Field of Search ............ 372/22, 21; 359/328

[56] References Cited

U.S. PATENT DOCUMENTS

| | | | |
|---|---|---|---|
| 4,925,263 | 5/1990 | Sanford et al. | 359/328 |
| 5,022,729 | 6/1991 | Tamada et al. | 359/328 |
| 5,036,220 | 7/1991 | Byer et al. | 359/328 |
| 5,121,250 | 6/1992 | Shinozaki et al. | 359/328 |
| 5,150,376 | 9/1992 | Ohmori et al. | 372/22 |

FOREIGN PATENT DOCUMENTS

| | | | |
|---|---|---|---|
| 0382462 | 8/1990 | European Pat. Off. | 359/328 |
| 0302328 | 12/1989 | Japan | 359/328 |
| 0282232 | 11/1990 | Japan | 359/328 |
| 0316198 | 1/1991 | Japan | . |
| 0251826 | 11/1991 | Japan | 359/328 |

OTHER PUBLICATIONS

Patent Abstracts of Japan, vol. 16, No. 483 (P-1432) Oct. 7, 1992 & JP-A-04 172 427 (Matsushita), Jun. 19. 1992.
Patent Abstracts of Japan, vol. 15, No. 166 (P-1195) Apr. 25, 1991 & JP-A-03 031 828 (NEC). Feb. 12, 1991.
Patent Abstracts of Japan, vol. 17, No. 36 (P-1474) Jan. 22, 1993 & JP-A-04 254 835 (Matsushita), Sep. 10, 1992.
Patent Abstracts of Japan, vol. 17, No. 70 (P-1485) Feb. 12, 1993 & JP-A-04 276 725 (Matsushita), Oct. 1, 1992.
Moshe Nazarathy, et al "Spread-spectrum non-linear-optical interactions: quasi-phase matching with pseudorandom polarity reversals", OPTICS LETTERS, vol. 12, No. 10, Oct. 1987, pp. 823-825, New York, N.S.

*Primary Examiner*—Georgia Y. Epps
*Attorney, Agent, or Firm*—Stevens, Davis, Miller & Mosher

[57] ABSTRACT

The wavelength tolerance of a frequency doubler is enhanced so as to perform stable operation. Further, with the use of this frequency doubler, a laser source can directly modulate a laser. A waveguide and a periodic domain inverted layer are formed on an LiTaO$_3$ substrate of −C plate, and the waveguide is divided into a plurality of zones having different propagation constants. A fundamental wave inputted in the waveguide is converted into a harmonic wave in each of the zones, and is emitted as SHG light. Parts for modulating the phases of the harmonic waves produced in the respective zones are provided between the zones.

34 Claims, 22 Drawing Sheets

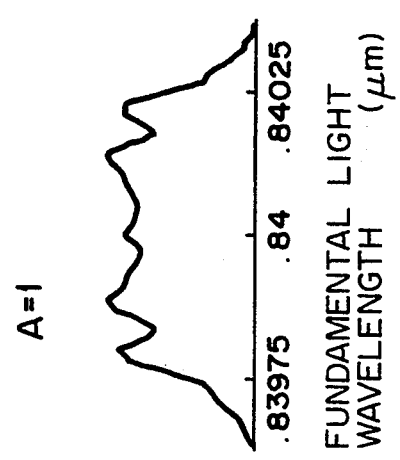
FIG. 21A
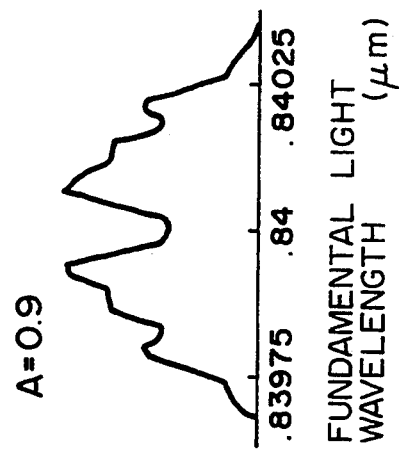
FIG. 21B
FIG. 21C
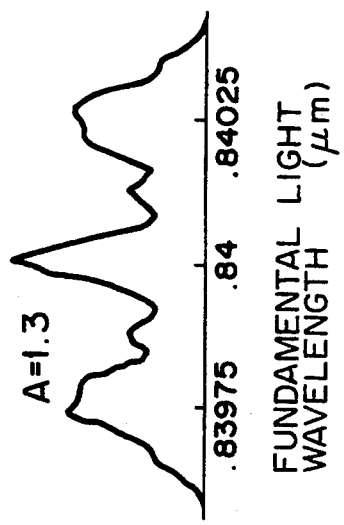
FIG. 21D
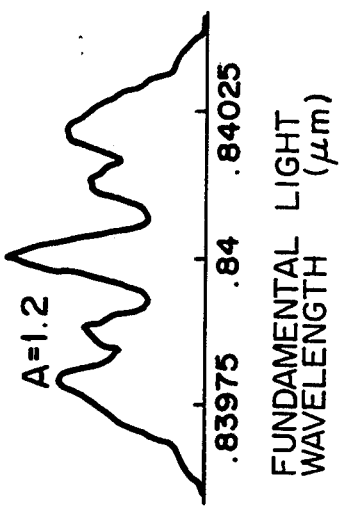
FIG. 21E
FIG. 21F
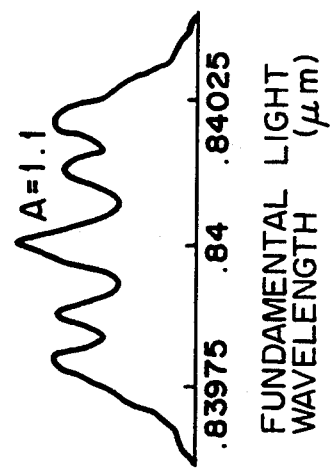

FREQUENCY DOUBLER AND LASER SOURCE

FIELD OF THE INVENTION

The present invention relates to a frequency doubler adapted to be used in the optical data processing field using coherent light, or the applied optic measurement and control field.

PRIOR ART OF THE INVENTION

Referring to FIG. 31 which shows a structure of a conventional frequency doubler, which converts a fundamental wave (having a wavelength of less than 0.84 μm) so as to produce a harmonic wave (having a wavelength of 0.42 μm). The operation of the frequency doubler will be detailed hereinbelow. It is noted that this frequency doubler is detailed in Japanese Laid-Open Patent Application No. 3-16198 which discloses a frequency doubler and a laser source using the same. As shown in FIG. 31, a waveguide 102 is formed in an LiNbO$_3$ substrate 101, and further, a layer 103 whose domain is periodically inverted (domain inverted structure) is formed on the waveguide 102. The transmission mismatching between the propagation constants of the fundamental wave and the harmonic wave is compensated by the periodic structure of the domain inverted layer 3 so as to effectively produce a second harmonic wave. A frequency doubler for converting a wavelength with the use of the domain inverted layer has a very narrow phase matching wavelength tolerance within which a wavelength can be converted although it has a high conversion efficiency. Accordingly, the propagation constant of the waveguide is partially changed so as to widen the tolerance of the frequency doubler. Should the propagation constant of the waveguide be changed, the phase matching wavelength in the waveguide would be changed. The wavelength of incident light that can satisfy a phase matching condition with which the frequency doubler can convert the wavelength is called a phase matching wavelength. Accordingly, if the width of the waveguide is partially changed, the phase matching wavelength varies in accordance with a width of the waveguide. Accordingly, even though the wavelength of incident light varies, the phase matching condition can be satisfied in any part of the waveguide having a certain width, and accordingly, the wavelength tolerance of the frequency doubler can be increased, that is, a frequency doubler which can stably convert a wavelength can be produced. Further, it is noted that the phase matching condition between the zones can also be satisfied by changing the depth of the waveguide in zones, and accordingly, a frequency doubler having a large wavelength tolerance can be produced.

As mentioned above, in a method in which a frequency doubler having a domain inverted layer as a basic structure divided into more than two zones so as to make phase matching conditions different from one another between the zones in order to increase the wavelength tolerance of the frequency doubler, second harmonic waves are produced in a wide wavelength range. However, since the second harmonic waves produced in the respective zones interfere with one another, the output power of the second harmonic wave to be produced increases or decreases in accordance with a variation in the wavelength of the inputted fundamental wave. As a result, no stable output can be obtained.

Further, the above-mentioned frequency doubler does not offer any problem concerning the phase matching conditions between the zones, but the relationship among the phase matching conditions between the zones should has an optimum condition. There have been offered the following problems: that is, if it is out of the above-mentioned condition, no stable output can be obtained. Further, no highly efficient conversion can be made.

SUMMARY OF THE INVENTION

The present invention has been devised in order to solve the above-mentioned problems, and accordingly, one object of the present invention is to provide a frequency doubler comprising a domain inverted structure, as a basic structure, which can produce a stable harmonic wave even with a usual semiconductor laser which varies its wavelength in dependence upon a temperature.

To this end, according to the present invention, there is provided a frequency doubler having a periodic domain inverted layer formed in a nonlinear optical crystal, the period of the domain inverted layer discretely varying in a light transmitting direction, and means for modulating the phase of light provided in parts where the periods different from one another.

Further, according to the present invention, there is provided a frequency doubler comprising a wave guide and a periodic domain inverted layer formed in a nonlinear optical crystal, the waveguide having a propagation constant which discretely varies in a light transmitting direction, and means for modulating the phase of light, provided in parts where the propagation constants are different from one another.

Further, according to the present invention, a frequency doubler comprising a nonlinear optical crystal substrate and a periodic domain layer formed so as to extend in a part of the nonlinear optical crystal substrate, the layer being divided into equal zones each having a domain inverted period so that a difference in domain inverted periods between adjacent zones satisfies the following relationship:

$$0.9\ \Lambda_p^2\ n/L < r_{op} < 1.2\ \Lambda_p^2\ n/L$$

or $$0.4\ \Lambda_p^2\ n/L < r_{op} < 0.5\ \Lambda_p^2\ n/L$$

wherein $\Lambda_p$ (p=1, 2, 3, ... n−1) is the domain inverted period of each of the zones, n is the number of zones, L is the length of the part, and $r_{op}$ is the difference in domain inverted period between the adjacent zones; that is, $$r_{op} = \Lambda_{p+1} - \Lambda_p.$$

Further, according to the present invention, a frequency doubler comprising a nonlinear optical crystal substrate, a wave guide formed in the nonlinear optical crystal substrate and a periodic domain inverted layer formed in the wave guide, the wave guide being divided into equal zones respectively having phase matching wavelengths, the relationship between the phase matching wavelengths of adjacent zones satisfying the following condition:

$$0.9 \beta_m^2 \text{ n/L} < \beta_m - \beta_{m-1} < 1.2 \beta_m^2 \text{ n/L}$$

or $$0.4 \beta_m^2 \text{ n/L} < \beta_m - \beta_{m-1} < 0.5 \beta_m^2 \text{ n/L}$$

where $$\beta_m (m=2, 3, \ldots n) = \lambda_m/2\{N_{2\omega}(\lambda_m) - N_\omega(\lambda_m)\};$$

$$\beta_{m-1}(m=2, 3, \ldots n) = \lambda_{m-1}/2\{N_{2\omega}(\lambda_{m-1}) - N_\omega(\lambda_{m-1})\};$$

$\lambda_m$ (m=1, 2, 3, ... n) is a phase matching wavelength in each zone of the wave guide;

$N_{107}(\lambda_m)$ (m=1, 2, 3, ... n) is an effective index of each zone for the fundamental wave;

$N_{2\omega}(\lambda_m)$ (m=1, 2, 3, ... n) is an effective index of each zone for SHG light;

n is the number of zones; and

L is the overall length of the wave guide.

Since with the frequency doubler according to the present invention the propagation constants in the respective zones of the waveguide are different from one another, the wavelengths of the fundamental waves which can be converted in the respective zones are different from one another. Accordingly, even though the wavelength of a fundamental wave varies, it can be converted into a second harmonic wave in any one of these zones having different propagation constants, and accordingly, the wavelength tolerance can be enlarged. On the contrary, with conventional frequency doublers, second harmonic waves produced in the respective zones interfere with each other, and accordingly, such interference affects the wavelength dependency of the second harmonic waves so that stable characteristics could not be obtained.

The interference of the second harmonic wave produced in each zone is determined by the phase relationship of SHG light produced in the zone. Accordingly, by inserting a part which controls the phase of a second harmonic wave between two zones respectively having different phase matching conditions, the effect of interference between second harmonic waves produced in these zones can be reduced so as to obtain stable characteristics. As a result, it is possible to enhance the tolerance for the wavelength of the frequency doubler; thereby it is possible to produce a stable harmonic wave.

Further, with a method of enhancing a wavelength tolerance of a frequency doubler having a periodic domain inverted layer as a basic structure, in which the domain inverted layer is divided into more than two zones, and phase matching conditions of the respective zones are different from one another, the wavelength tolerance can be enhanced while a stable output power can be obtained by the wavelength conversion, and further, the relationship of phase matching conditions between the zones by which the wavelength conversion can be made with a high degree of efficiency can be determined. By determining several values in the relationships of the phase matching conditions, a stable second harmonic wave can be produced with a high degree of efficiency.

Other and further objects, features and advantages of the invention will be apparent more fully and clearly from the following description of preferred embodiments which will be explained with reference to the accompanying drawings in which:

BRIEF DESCRIPTION OF THE DRAWINGS

FIGS. 21A to 21G are view illustrating relationships between normalized values A and variation rates;

DESCRIPTION OF PREFERRED EMBODIMENTS

Figure 1:
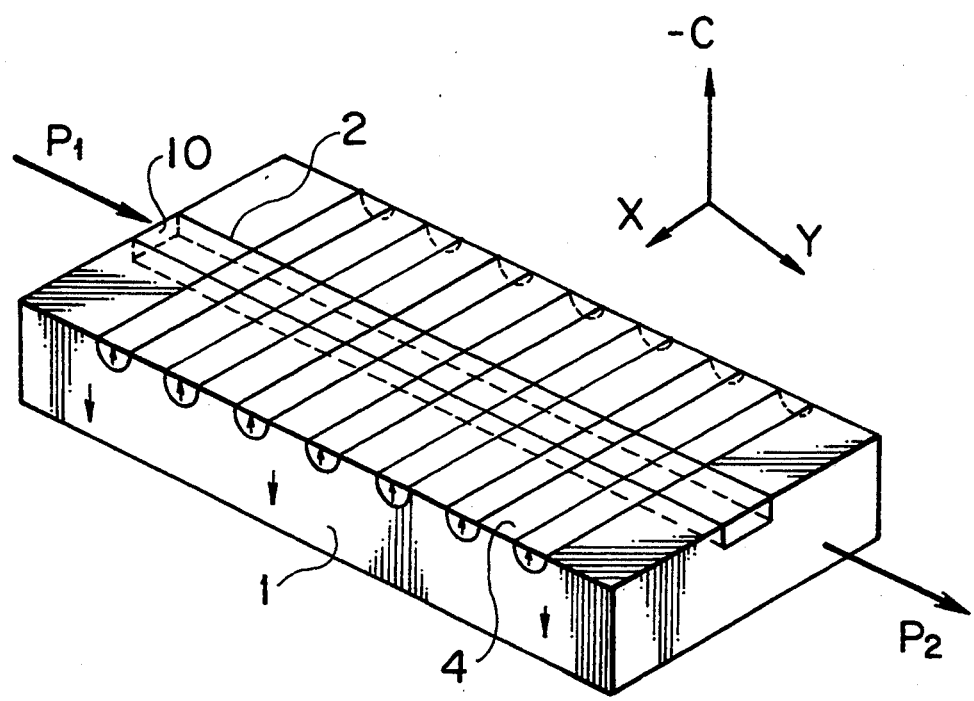
FIG. 1 is a view for explaining a principle of a frequency doubler.

Before explanation of embodiments is detailed, the operation principle of a domain inverted type frequency doubler will be explained with reference to FIG. 1 which is a structural view showing a frequency doubler. Referring to FIG. 1, there are shown an LiTaO$_3$ substrate of a $-C$ plate (on the $-$ side of a substrate which is cut out orthogonal to the C-axis), a domain inverted layer 3, a proton exchange layer 2, a fundamental wave P$_1$ having a wavelength of 840 nm and a second harmonic wave P$_2$ having a wavelength of 420 nm.

The domain inverted layer 3 is a part in which the orientations of domains are alternately inverted in the domain orientation of the substrate 1. In the case of the LiTaO$_3$ substrate 1, the domain orientation is the $+C$ direction, and the domain orientation of the domain inverted layer 3 is the $-C$ direction. The period of the domain inverted layer 3 varies in accordance with the wavelength of a fundamental wave and a refraction index of a waveguide. If the wavelength of the fundamental wave is 840 nm, the primary period is about 3.7 $\mu$m, and a third order period is three times as large as the primary period, that is, 11.1 $\mu$m (the domain inverted period is an odd number of times as large as the primary period. The phase matching condition is satisfied through the domain inversion and the wavelength conversion is carried out only when the period is coincident with the odd number-th order period. It is noted that the conversion efficiency is decreased to one to the square of the odd order number as the order number increases).

Figure 2A:
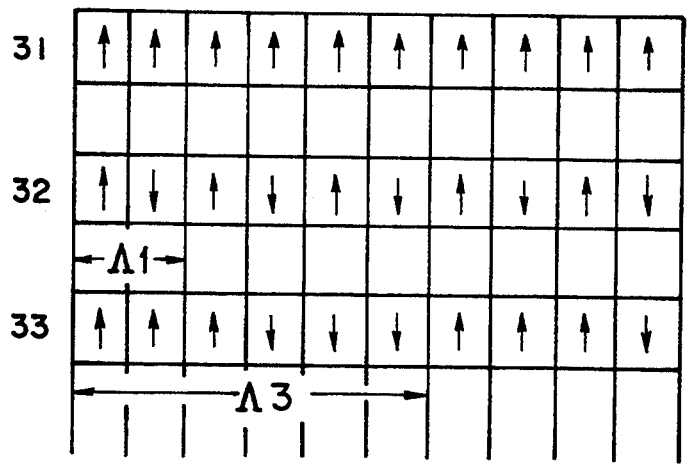
FIG. 2A is a view illustrating configurations of elements having different domain conditions.
Figure 2B:
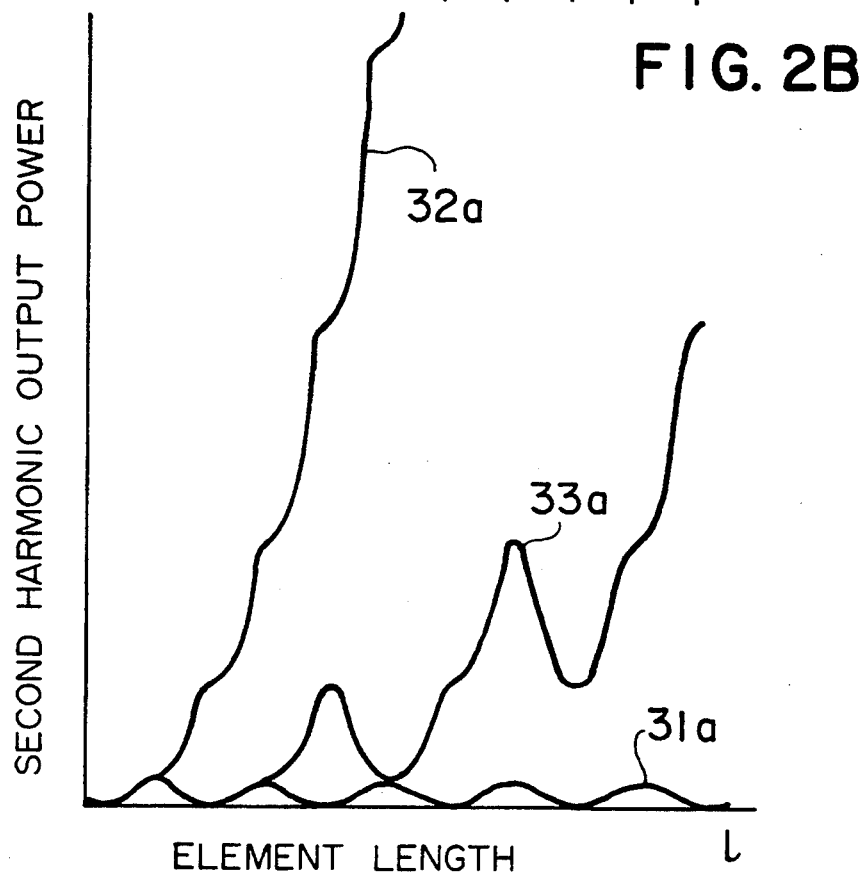
FIG. 2B is a view indicating dependency of SHG light output power upon a length of a frequency doubler.

FIGS. 2A and 2B show relationships of the lengths of an element 31 in which the domain is not inverted, a domain inverted element 32 (frequency doubler) having a primary period, and a domain inverted element 33 (frequency doubler) having a third order period, with second harmonic wave output powers. As shown in FIG. 2, the primary period $\Lambda_1$ is given by $\Lambda_1 = \lambda/2(N_{2\omega} - N_\omega)$ where $N_\omega$ is an effective refractive index with respect to a fundamental wave (having a wavelength $\lambda$) and $N_{2\omega}$ is an effective refractive index with respect to a second harmonic wave (having a wavelength of $\lambda/2$), and the third-order period $\Lambda_3$ is given $3*\Lambda_1$, that is, it is three times large as the primary period. The effective index is that light is actually sensible. The smaller the order number of the period, the higher the output power becomes. In FIG. 2B, 31a, 32a and 33a represent the second harmonic output when the domain is not inverted, when the domain is inverted (primary period), and when the domain is inverted (third-order period), respectively. The phase matching condition is such that the phase velocity of the fundamental wave is equal to that of SHG light. Only when this condition is satisfied, the wavelength conversion can be made with a high degree of efficiency. The wavelength with which the phase matching condition is satisfied is called a phase matching wavelength. The phase matching condition of the domain inverted type SHG element is given by $\Lambda_m = m*\lambda/2(N_{2\omega} - N_\omega)$ where $m = 1, 2, 3, \ldots$.

Figure 3:
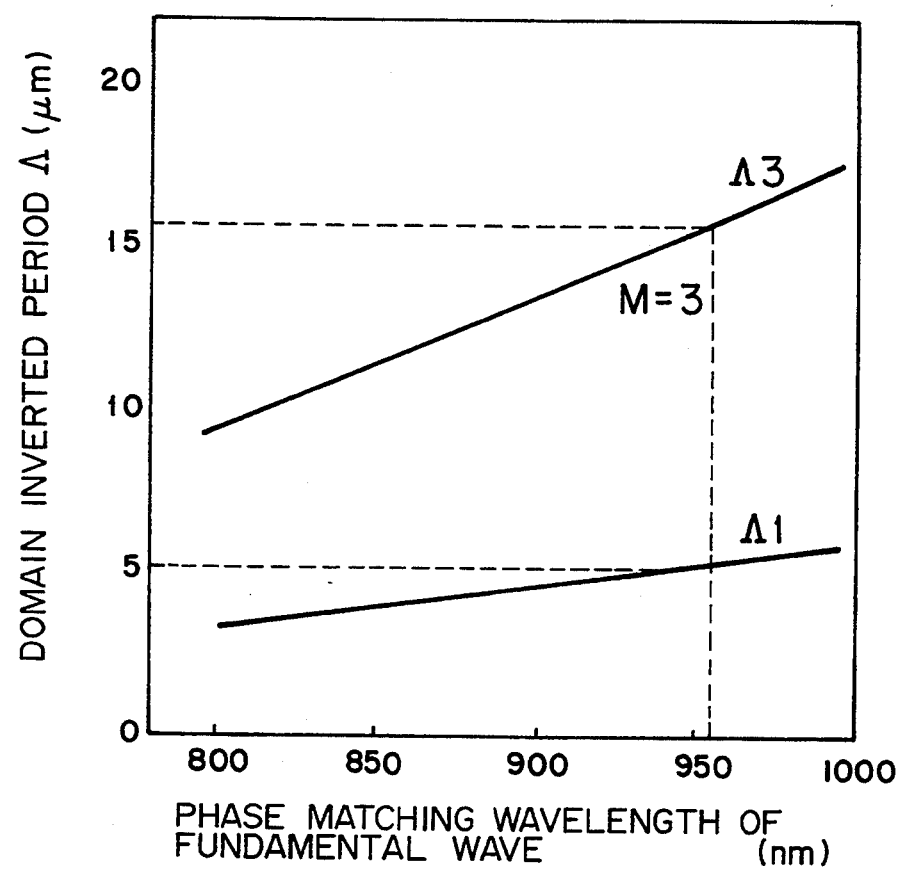
FIG. 3 is a view indicating dependency of a domain inverted period upon a phase matching wavelength.

Meanwhile, a visible laser source emitting blue light having a wavelength of less than 480 nm is presently desired for compact discs and optical memories. Accordingly, it is particularly important to produce a frequency doubler which can emit blue light. FIG. 3 shows a relationship between the domain inverted period and the phase matching wavelength. The shorter the phase matching wavelength, the shorter period of the domain inverted layer becomes, and accordingly, a domain inverted layer having a third order period of less than 15 $\mu$m or a primary period of less than 5 $\mu$m is required in order to obtain a fundamental wave having a wavelength of less than 960 nm and a second harmonic wave having a wavelength of less than 480 nm.

Embodiment 1

Figure 4:
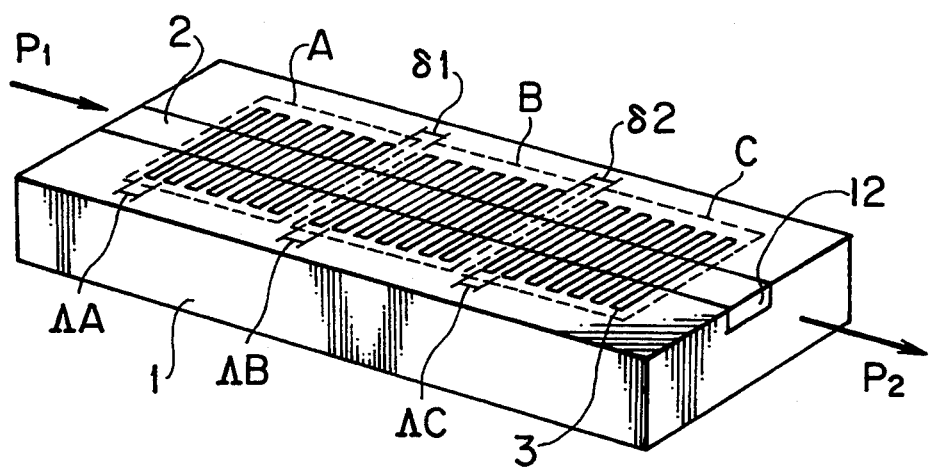
FIG. 4 is a structure view illustrating a frequency doubler in a first embodiment.

Explanation will be made of the structure of a frequency doubler in an embodiment 1 of the present invention. FIG. 4 is a structural view illustrating the frequency doubler in the embodiment 1 of the present invention. This embodiment exhibits a domain inverted type frequency doubler in which a domain inverted layer 3 is formed on an LiTaO$_3$ substrate 1, and a waveguide 2 is produced by using proton-exchange. In FIG. 4, there are shown an LiTaO$_3$ substrate of a $-C$ plate, a domain inverted waveguide 3, a proton-exchange layer 2, a fundamental wave P$_1$ having a wavelength of 840 nm and a second harmonic wave P$_2$ having a wavelength of 420 nm (which will be denoted hereinbelow as SHG light). The domain inverted layer 3 is formed on the LiTaO$_3$ substrate 1 extending over a length of about 15 mm. The domain inverted layer consists of zones A, B, C having different periods. The lengths of the respective zones are 5 mm, and the periods of the zones are $\Lambda_A = 3.7$ $\mu$m, $\Lambda_B = 3.7028$ $\mu$m and $\Lambda_C = 3.7056$ $\mu$m, respectively. A gap $\delta_1$ (between the zones A and B) and a gap $\delta_2$ (between the zones B and C) are formed as parts for modulating the phase of light between the zones having different periods. Optimum values of the gaps $\delta$ are calculated (as will be explained latter) so as to obtain $\delta_1 = 0.1$ $\mu$m and $\delta_2 = 3.6$ $\mu$m. The fundamental wave P$_1$ having entered into the waveguide 2 having a width 4 $\mu$m and a depth of 2 $\mu$m is converted into SHG light P$_2$ in the respective zones A, B, C, which is emitted from an emitting part 12.

Figure 5A:
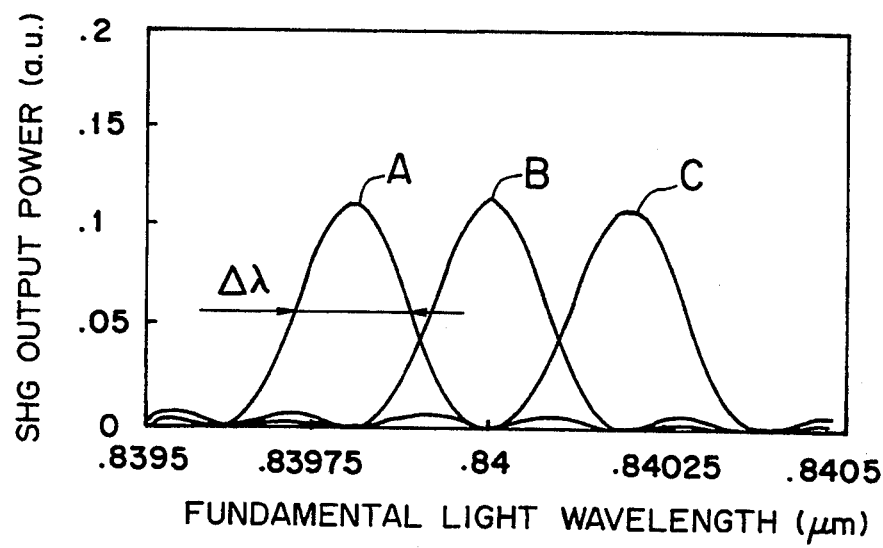
FIGS. 5A to 5C are views showing wavelength dependency of SHG light in the frequency doubler in the first embodiment.
Figure 5B:
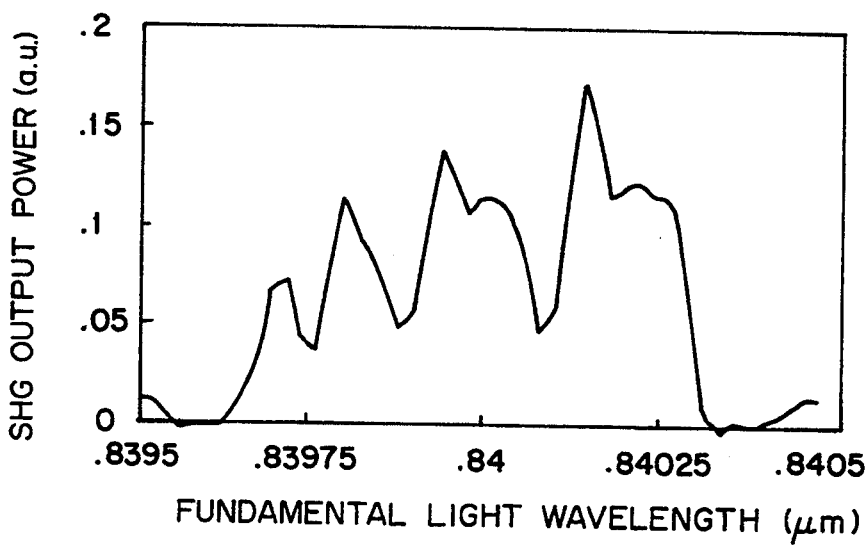
Figure 5C:
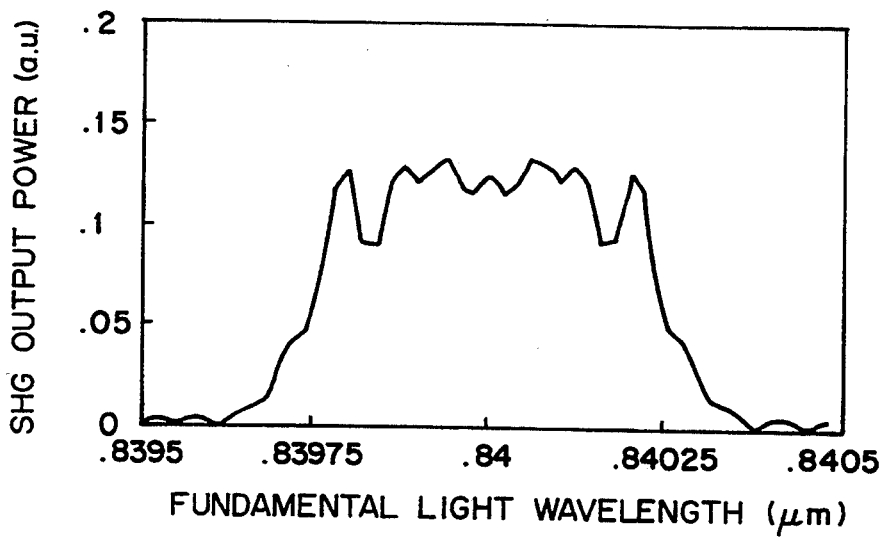

FIG. 5a shows the wavelength dependency of the harmonic wave (SHG) output power in such a case that the zones A, B, C exist solely. Referring to this figure, in the case of a frequency doubler having the zone A alone, that is, the frequency doubler shown in FIG. 1 (the domain inverted layer having a period $\Lambda_A$ is formed extending over a length of 5 mm), the wavelength tolerance is small, that is, a half value breadth $\Delta\lambda$. Meanwhile, in this embodiment, since the zones A, B, C have different domain inverted periods, respectively, the wavelengths of light for phase-matching are different from each other. As a result, wave bands in the zones A, B, C, by which the wavelength conversion can be made, are deviated from one another as indicated by A, B, C in FIG. 5A, that is, the SHG light can be obtained over a wide wavelength band width; thereby it is possible to increase the wavelength tolerance. However, should the zones A, B, C be continuous with each other, the SHG light produced in each of the zones interferes with that produced in another zone. For example, estimating that a fundamental wave (having a wavelength around $(\lambda_A \lambda_B)/2$) between a wavelength $\lambda_B$ (with which the phase matching condition is satisfied in the zone B) and a wavelength $\lambda_4$ (with which the phase matching condition is satisfied in the zone A) is introduced into the frequency doubler, the zones A, B both emit SHG light in wave guide modes having an equal wavelength so that they interfere with each other. Accordingly, in such a case that no gap $\delta$ is formed, the wavelength dependency of the output power of the SHG light is shown in FIG. 5B, that is, it is remarkable that the outputs of the SHG light with respect to the fundamental wave are heightened or weakened with one another. Accordingly, the output power of emitted SHG light greatly varies in dependence upon a variation in the wavelength of the inputted fundamental wave. Thus, if a variation in the SHG output power is great, no stable SHG output power can be obtained due to a variation in the wavelength of the fundamental wavelength. Accordingly, in order to suppress the interference between the output powers of SHG light produced in the respective zones A, B, C, the gaps $\delta_1$, $\delta_2$ for adjusting the phases of the SHG outputs produced in the respective zones A, B, C are provided between the zones. If setting is made such as $\delta_1 = 0.1$ μm and $\delta_2 = 3.6$ μm, the interference between the SHG light outputs is reduced as shown in FIG. 5C from which it can be understood that the SHG output power can be stably obtained even though the wavelength of the fundamental wave varies. Accordingly, a stable wide tolerance can be obtained for variation in the wavelength of the fundamental wave; thereby it is possible to obtain a stable SHG output power.

I. Theoretical analysis of the frequency doubler in the Embodiment 1

I-I: Derivation of Analytic Expressions

In order to analyze the arrangement of the embodiment 1, the phase matching condition was analytically obtained. The strength distributions of a fundamental wave and SHG light in a nonlinear medium can be expressed by the following expressions:

$$A^{\omega}(z) = A(z)\exp(-j\beta^{\omega}z)$$

$$A^{2\omega}(z) = B(z)\exp(-j\beta^{2\omega}z)$$

where z is taken in the light propagating direction, and

A(z): field amplitude intensity of fundamental wave
B(z): field amplitude intensity of SHG light.

The field intensity distribution B(Z) of the SHG which is produced when the light propagated through the above-mentioned nonlinear medium is in general exhibited by the following differential equation:

$$dB(z)/dz = -j^*\kappa^* dz^* A(z)^{2*}\exp(j^*2K^*z) \qquad \text{EQ-0}$$

where $2K = \beta^{2\omega} - 2\beta^{\omega}$ j: complex unit
κ: coupling constant
d(z): nonlinear optical constant
z: coordinate in the propagation direction
k: SHG light propagation constant
$\beta^{\omega}$: fundamental wave propagation constant
$\beta^{2\omega}$: SHG light propagation constant.

The propagation constants $\beta^{\omega}$, $\beta^{2\omega}$ are functions of the wavelength of the inputted fundamental wave, and are determined by a dispersion of refractive index inherent (refractive index dependency) to a substance. The refractive index which is sensible by light transmitted through the waveguide is called as "effective refractive index". Denoting effective indices for the fundamental wave having a wavelength $\lambda$ and the SHG light having a wavelength of $\lambda/2$ as $N_{\omega}(\lambda)$ and $N_{2\omega}(\lambda)$, respectively, the propagation constants $\beta^{\omega}$, $\beta^{2\omega}$ of the SHG light are exhibited respectively by:

$$\beta^{2\omega}(\lambda) = 2\pi^* N_{2\omega}(\lambda)/(\lambda/2)$$

$$\beta^{\omega}(\lambda) = 2\pi^* N_{\omega}(\lambda)/\lambda \qquad \text{EQ-1}$$

and accordingly, $\Delta k(\lambda)$ is given by:

$$\Delta k(\lambda) = \beta^{2\omega}(\lambda) - 2\beta^{\omega}(\lambda) = 4\pi(N_{2\omega}(\lambda_m) - N_{\omega}(\lambda_m))/\lambda.$$

$\Delta k(\lambda)$ is simply denoted herebelow as $\Delta k$. When the conversion from the fundamental wave into the SHG light occurs, the intensity of the fundamental wave is decreased. However, the conversion from the fundamental wave into the SHG light is extremely small, and accordingly, if estimation is made such that the field strength of the fundamental wave does not vary appreciably in the propagating direction, $A(z) = A_0$ (constant) can be taken. Accordingly, by solving the differential equation EQ-0, the field intensity of the SHG light is given by:

$$B(L) - B(O) = -j^*\kappa^* A_0^2 \int_0^L d(z)^*\exp(j^*\Delta k^* z)dz$$

Setting the field intensity of the SHG light to 0, $B(0) = 0$ can be obtained. Accordingly, the field intensity of the SHG light is a function of L, that is, B(L): that is:

$$B(\Delta k) = B(L) - B(0) = B(L) \qquad \text{EQ-2}$$

Now considering a variation in the field intensity of the SHG light when the wavelength $\lambda$ of the fundamental wave varies, since $\Delta k$ varies due to the variation of $\lambda$, the field strength B(L) of the SHG light at the output end can be expressed by a function of $\Delta k$.

Figure 6A:
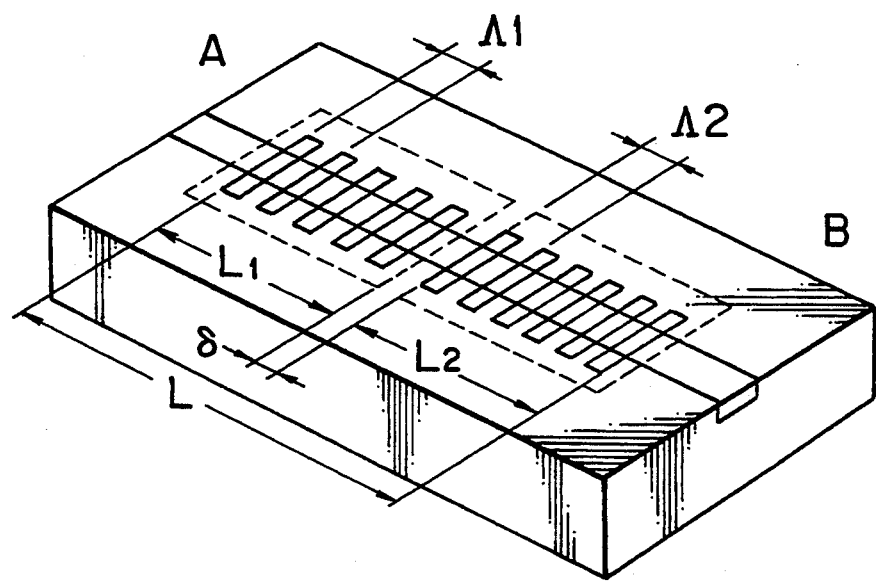
FIGS. 6A to 6B are views illustrating an analysis model in the first embodiment.
Figure 6B:
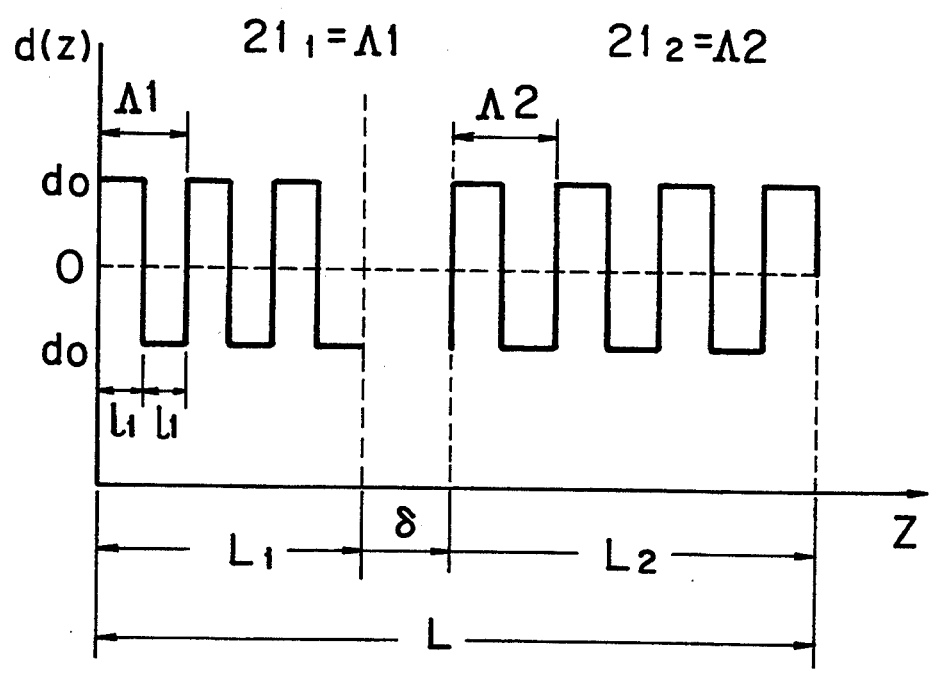

Now considering a model of a domain inverted type frequency doubler as shown in FIG. 6A, the arrangement of the model includes a zone A of the domain inverted layer having a period $\Lambda_1$, a zone B of a domain inverted layer having a period of $\Lambda_2$, a zone C of a domain inverted structure having a period of $\Lambda_3$ and phase matching parts having lengths $\delta$ between the zones. FIG. 6B shows the distribution of the nonlinear optical constant d(z) which is sensed by light propagating through the waveguide, with respect to the propagation distance for the frequency doublers shown in FIG. 6A. In the zone A, the domain inverted layer having a period $\Lambda_1$ is formed over a length of $L_1$, having a nonlinear optical constant $d_1(z)$, and in the zone B, the domain inverted layer having a period of $\Lambda_2$ is formed over a length of $L_2$, having a nonlinear optical constant $d_2(z)$. Further, the gap $\delta$ is formed between the zones A, B. Estimating that light is propagated through the domain inverted layer having the above-mentioned distribution, the SHG conversion efficiency is given by:

$$B(\Delta k) = -j^* \kappa^* Ao^2 \left( \int_0^{L_1} d_1(z)^* \exp(j^* \Delta k^* z) dz + \int_{L_1 + \delta}^{L} d_2^* \exp(j^* \Delta k^* z) dz \right)$$

$$= -j^* \kappa^* Ao^2 \ [E_1(\Delta k) + E_2(\Delta k)]$$

In the above-mentioned equation:

$E_1(\Delta k) = ((1 - \cos(\Delta k^* I_1))/\sin(\Delta k^* I_1)$
$\quad *(1 - \exp(j^* \Delta k^* L_2))/\Delta k$ $E_2(\Delta k) = ((1 - \cos(\Delta k^* I_2))/\sin(\Delta k^* I_2)$
$\quad *(1 - \exp(j^* \Delta k^* L_2))^* \exp(j^* \Delta k^*(L_1 - \delta))/\Delta k$ where $L_1 = N_1 * \Lambda_1$ $I_1 = \Lambda_1/2$ $L_2 = N_2 * \Lambda_2$ $I_2 = \Lambda_2/2$.

Figure 7A:
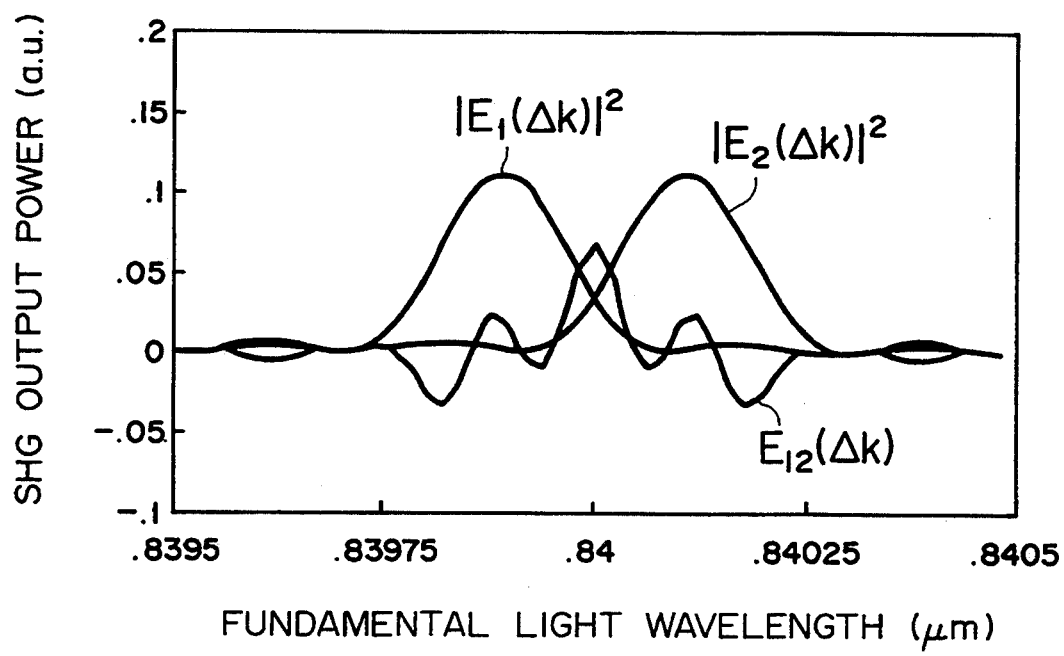
FIGS. 7A and 7B are views showing wavelength dependency of SHG light in the first embodiment.
Figure 7B:
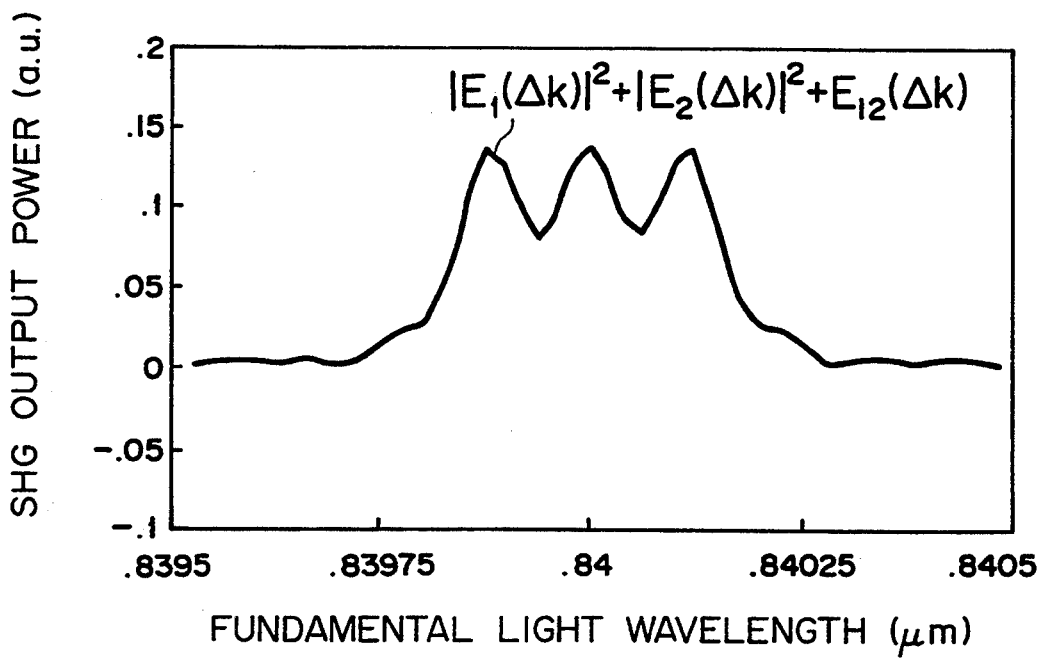

Then, the efficiency of conversion into SHG is obtained. Since the SHG output power is the square of SHG light, from the equation EQ-2 the power is given by:

$\eta = |B(L)|^2/|A(0)|^2$     EQ-3
$= \kappa^{2*} D_0^{2*} P_0^* |E_1(\Delta k) + E_2(\Delta k)|^2$
$= \kappa^{2*} D_0^{2*} P_0^* [|E_1(\Delta k)|^2 + |E_2(\Delta k)|^2 + E_{12}(\Delta k, \delta)]$ $|E_1(\Delta k)|^2 = (2/\Delta k^2)^*(1 - \cos(\Delta k^* I_1))^2$
$\quad * \sin^2(\Delta k^* N_1^* I_1)/\sin^2(\Delta k^* I_1)$ $|E_2(\Delta k)|^2 = (2/\Delta k^2)^*(1 - \cos(\Delta k^* I_2))^2$
$\quad * \sin^2(\Delta k^* N_2^* I_2)/\sin^2(\Delta k^* I_2)$ $E_{12}(\Delta k, \delta) = E_1(\Delta k)^* E_2(\Delta k) + E_1(\Delta k)^* E_2(\Delta k)$
$= 8(1 - \cos(\Delta k^* I_1))^*(1 - \cos(\Delta k^* I_2))$
$\quad * \sin(\Delta k^* N_1^* I_1)^* \sin(\Delta k^* N_2^* I_2)$
$\quad * \cos(\Delta k(N_1^* I_1 + N_2^* I_2 + \delta))/$
$\quad [\Delta k^{2*} \sin(\Delta k^* N_1^* I_1)^* \sin(\Delta k^* N_2^* I_2)]$ where $P_0$: intensity (power) of fundamental wave. For example, the relationship of $|E_1(\Delta k)|^2$, $|E_2(\Delta k)|^2$ and $E_{12}(\Delta k, \delta)$ with respect to $\lambda$ are shown in FIGS. 7A to 7B. FIG. 7A shows the values of $|E_1(\Delta k)|^2$, $|E_2(\Delta k)|^2$ and $E_{12}(\Delta k, \delta)$, and FIG. 7B shows the sum of them. $|E_1(\Delta k)|^2$ gives a relationship between $\lambda$ and $\eta$ when only the domain inverted layer having a period of $\Lambda_1$ is present extending over a length of $L_1$, and the same is said of $|E_2(\Delta k)|^2$. $E_{12}$ gives the effect of interference between the SHG light produced from the zone A and the SHG light produced from the zone B (FIG. 7A), and the SHG output conversion rate $\eta$ is given by the sum of them. Accordingly, if the zones including the domain inverted layers having the period $\Lambda_1, \Lambda_2, \ldots \Lambda_n$ are present, extending over the $L_1, L_2, \ldots L_n$, respectively, the obtained SHG output power is given by the sum the SHG output powers, $\Sigma |E_m(\Delta k)|^2$ when the respective zones are presented solely, and the sum of the parts indicating the interference between the zones, $\Sigma E_{ij}(\Delta k, \delta)$, that is:

$\eta = \kappa^{2*} D_0^{2*} P_0^* [\Sigma |E_m(\Delta k)|^2 + \Sigma E_{ij}(\Delta k, \delta)]$     EQ-4

As a result, the relationship between the SHG output and the wavelength of the fundamental wave for a frequency doubler in which the domain inverted layer is divided into more than two zones can be indicated by the equation EQ-4. Further, with the use of the equation EQ-4, the optimum design of the frequency doubler can be made.

I-2 Design of Optimum Structure of Frequency Doubler by Use of Analytic Expression With the use of the equation EQ-3, a frequency doubler having a wide wavelength tolerance was designed.

Figure 8A:
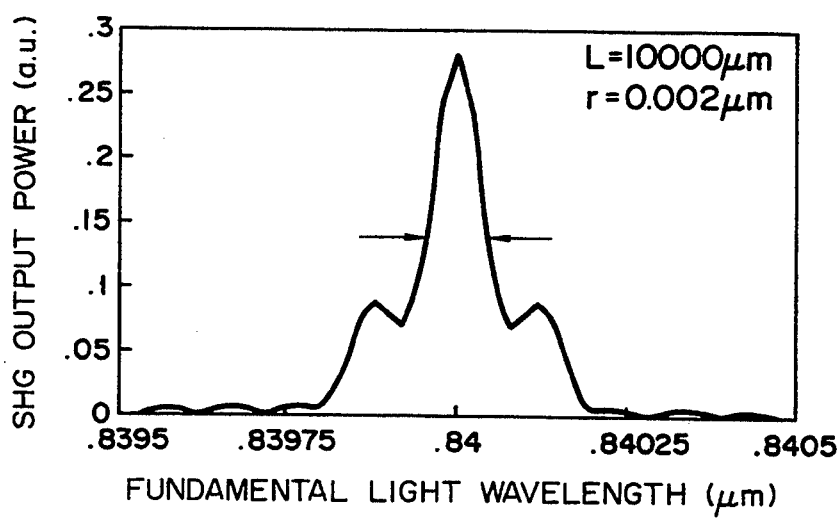
FIGS. 8A to 8C are views showing wavelength dependency of SHG light output power.
Figure 8B:
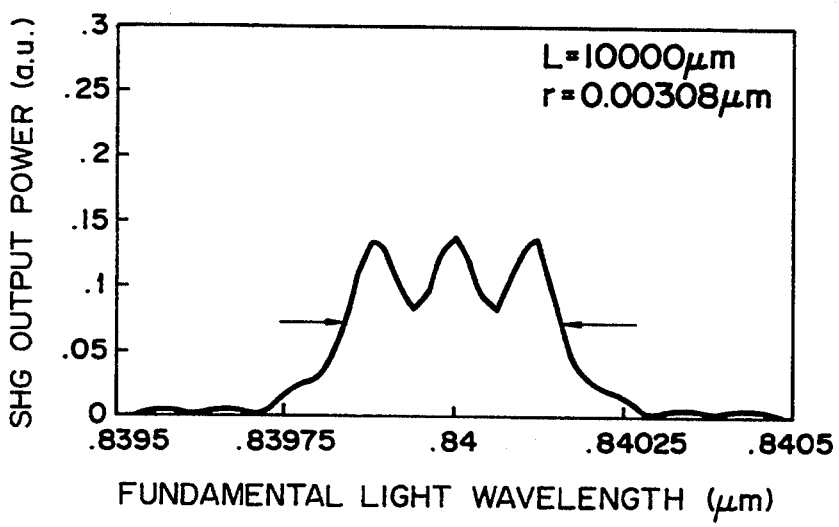
Figure 8C:
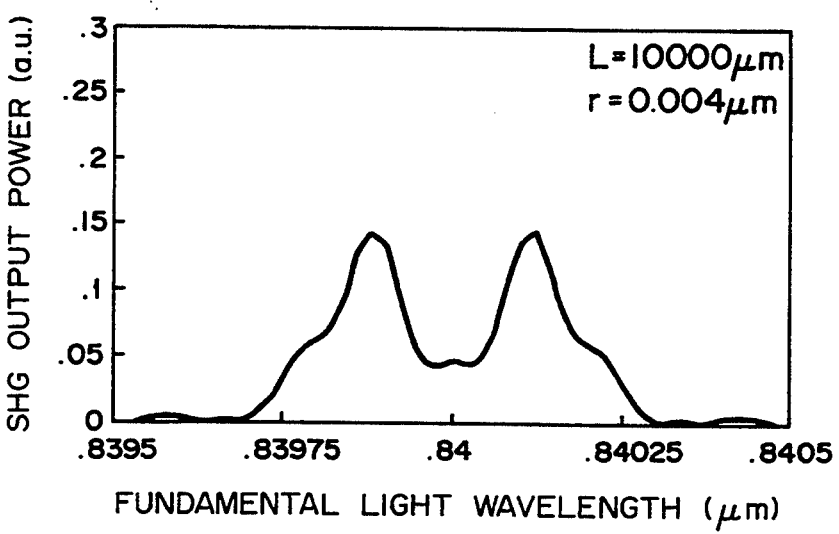
Figure 9A:
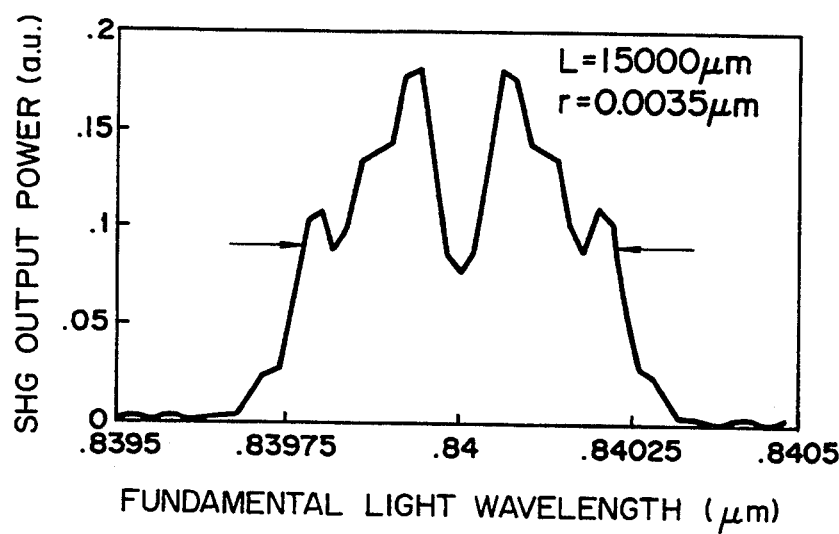
FIGS. 9A to 9C are views showing wavelength dependency of SHG light.
Figure 9B:
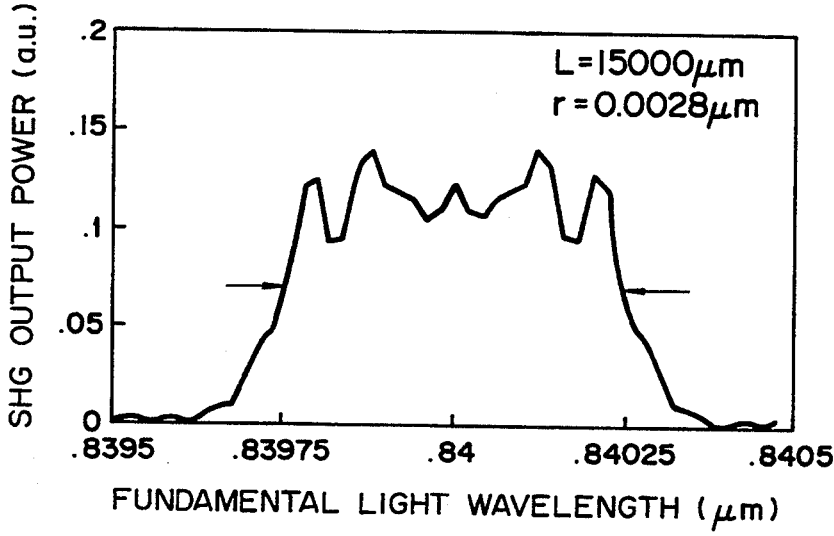
Figure 9C:
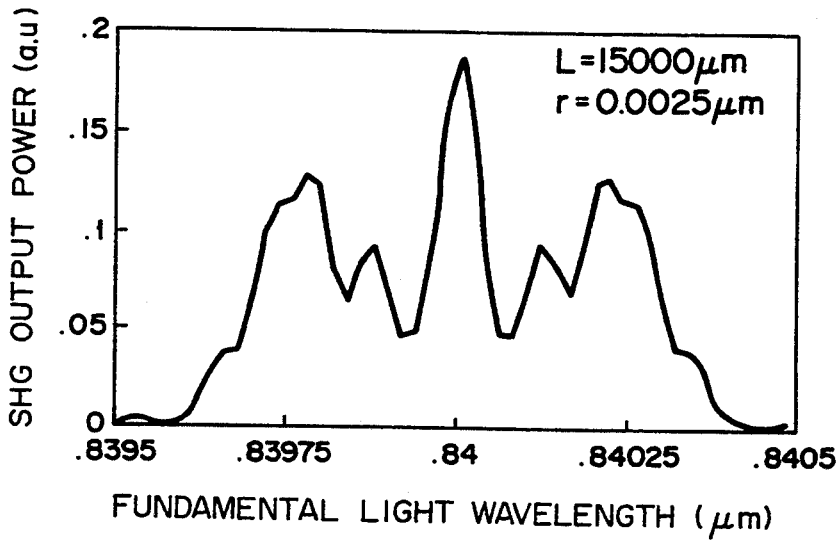

First, with the use of the equation EQ-3, the wavelength dependency of the SHG output power was obtained as shown FIGS. 8A to 8C and FIG. 9A to FIG. 9C. FIGS. 8A to 8C show the relationship between the wavelength and the SHG output power when setting is made such as the element length=1,000 μm, the division number=2, $\delta=0$, and the periods of the divided zones=3.7 μm and 3.7+r μm. FIGS. 9A to 9C show the relationship between the wavelength of the fundamental wave and the SHG output power by setting such as the element length=15,000 μm and $\delta_1=\delta_2=0$, and by dividing the domain inverted layer into three zones respectively having periods $\Lambda_0$, $\Lambda_0+r$ μm, $\Lambda_0+2r$ while $\delta_0=3.7$ μm. FIG. 8A to 8C show the results if r=0.002, 0.0028, 0.004 μm, respectively.

The reason why the SHG output power has a large peak as shown in FIG. 8A is such that the superposition of the peaks of $|E_1(\Delta k)|^2$ and $|E_2(\Delta k)|^2$ shown in FIG. 7A is large. Similarly, the reason why the output power of the SHG light has two peaks is such that the space between the peaks of $|E_1(\Delta k)|^2$ and $|E_2(\Delta k)|^2$ shown in FIG. 7A is widened. Accordingly, by optimizing the value of r shown in FIG. 8B, variations in the output power of the SHG light can be restrained, that is, it is understood that a stable output power of the SHG light can be obtained. FIGS. 9A to 9B are similar to FIGS. 8A to 8C. When the value of r gives an optimum value to the output power of the SHG light, variations in the output power of the SHG light can be restrained, and accordingly, a stable output power of the SHG light can be obtained. Thus, it is understood that the wavelength dependency of the SHG light varies greatly in dependence upon the value of r.

Figure 10:
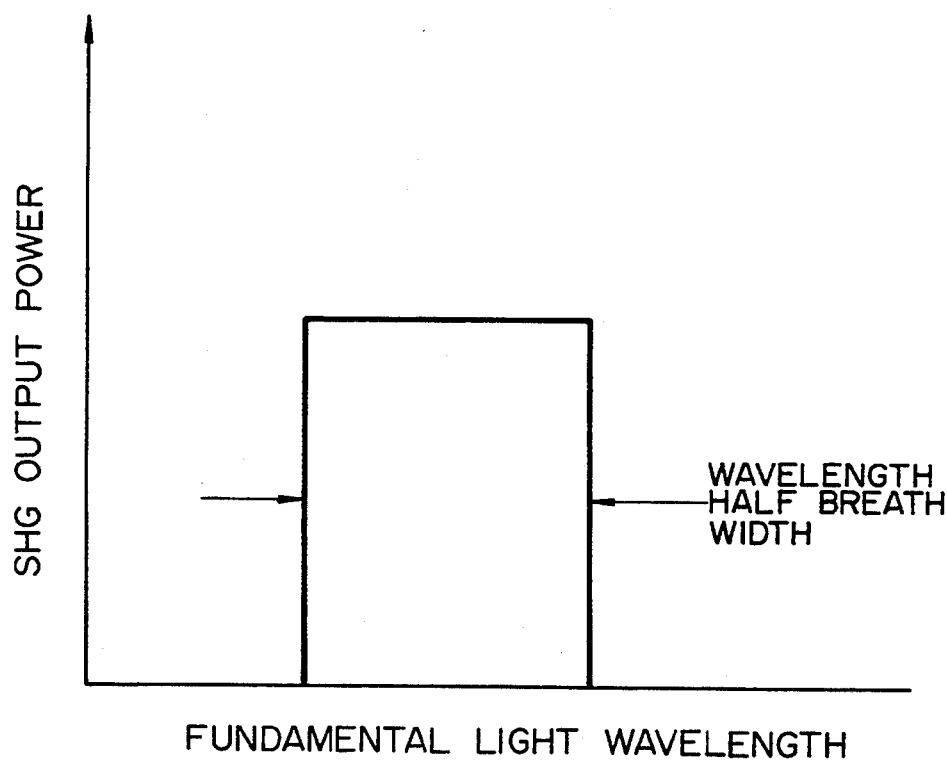
FIG. 10 is a view showing wavelength dependency of ideal SHG light output power.

In view of the above-mentioned relationships, an optimum design to a domain inverted type SHG element was made. The domain inverted type SHG element can perform conversion with a high degree of efficiency. However, the wavelength dependency upon an inputted fundamental wave is severe, and accordingly, it is difficult to obtain a stable output power. Since the wavelength band (wavelength half value width) of the fundamental wave which is obtained when the output power of the SHG light becomes one half of the peak as shown in FIGS. 8A to 8C and FIGS. 9A to 9C, falls in a trade-off relationship such that the maximum output power decreases as the half value width increased, as shown FIGS. 8A and 8B, and accordingly, the SHG output power drops if the wavelength tolerance increases. Further, as understood from FIGS. 8B and 9B, when the optimum value of R is given, the larger the division number, the wider the value of the wavelength half value width becomes. Under this condition, the output power of the SHG light with respect to the wavelength of an optimum fundamental wave, having a high degree of conversion efficiency and a wide half breadth width, is given by a rectangular wavelength dependency as shown FIG. 10 (such an SHG output power will be denoted hereinbelow as "SHG power spectrum").

Figure 11:
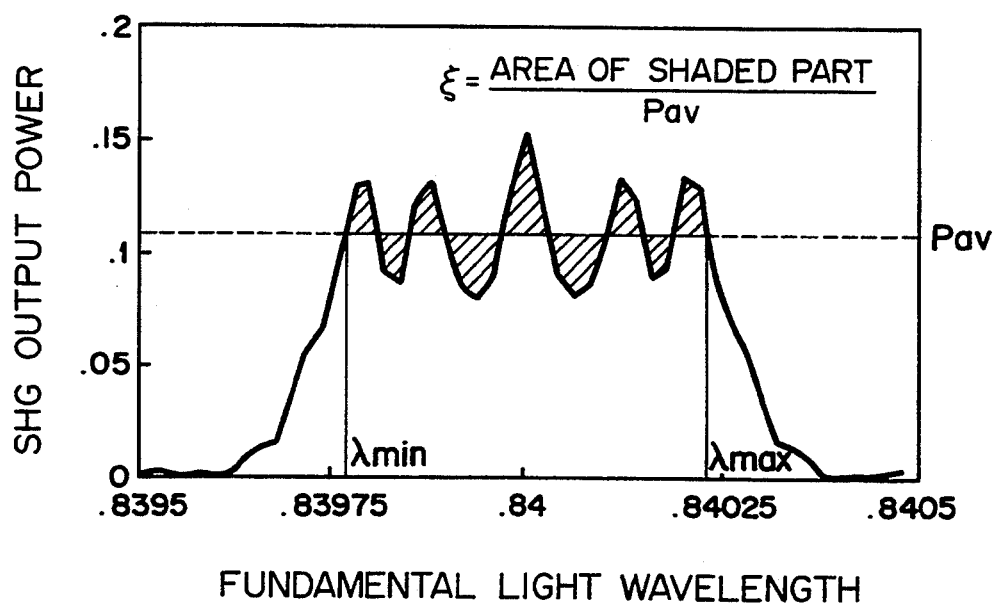
FIG. 11 is a view showing a definition to a variation rate.

Accordingly, the design was made as to the length of the element, the division number and differences between periods so as to obtain an optimum configuration. The optimum values were obtained as stated below. As shown in FIG. 11, the SHG output power with respect to the wavelength of the fundamental light varies around the maximum value. The degree of these variations are accumulated so as to obtain a variation rate $\xi$. When the variation rate $\xi$ becomes minimum, an optimum SHG power spectrum can be obtained. Thus, with the use of the variation rate, the optimum design can be made. The variation rate $\xi$ can be exhibited by the following expression:

$$\xi = \int_{\lambda_{min}}^{\lambda_{max}} |\eta - \eta_{av}| d\lambda / \eta_{av} \qquad \text{EQ-5}$$

$$\eta_{av} = \int_{\lambda_{min}}^{\lambda_{max}} \eta d\lambda / (\lambda_{max} - \lambda_{min})$$

$$\Lambda_{min} = 2\pi/\Delta k(\lambda_{min})$$

$$\Lambda_{max} = 2\pi/\Delta k(\lambda_{max})$$

Figure 12:
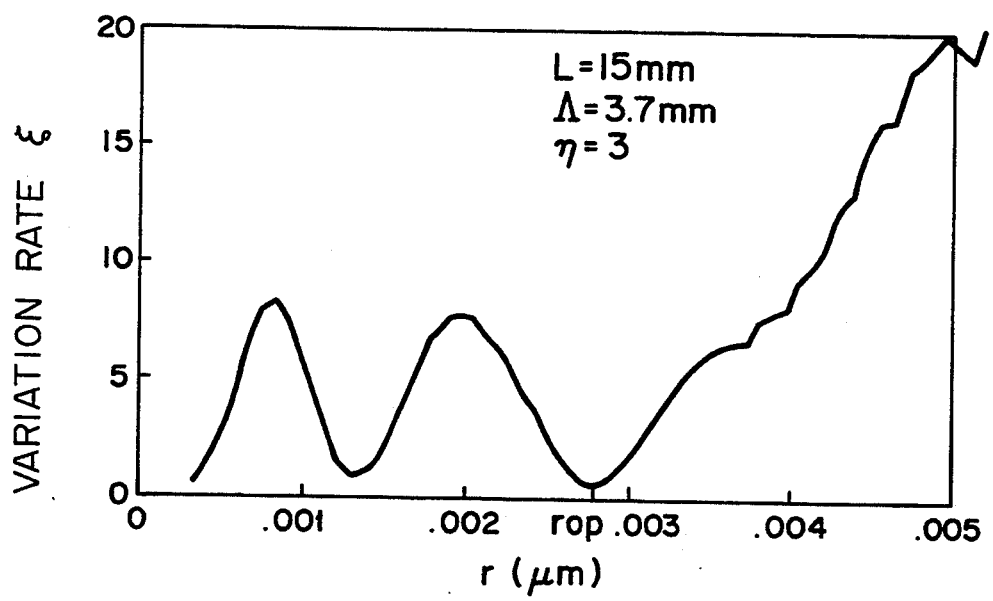
FIG. 12 is a view showing relationships of variation rates with respect to difference in period between zones.

At first, by setting the division number to 3, when the domain inverted layer was formed extending over 15 mm, having periods $\Lambda_0(=\Lambda_{min})$, $\Lambda_0+r$ μm, $\Lambda_0+2r$ ($\Lambda_{max}$) while $\Lambda_0=3.7$ μm for the respective zones, the relationship between r and the variation rate is shown in FIG. 12.

Figure 13:
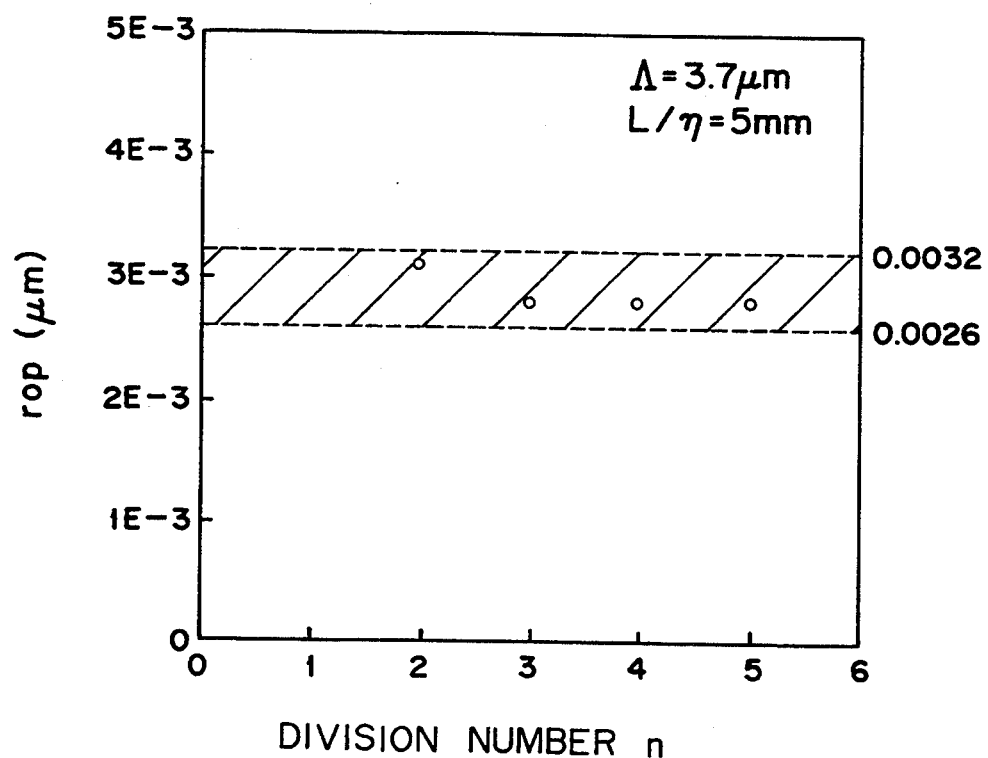
FIG. 13 is a view showing a relationship between a division number n and an optimum period difference $r_{op}$.

When the value of r is 0.0028 μm, the variation rate becomes minimum, that is, it is understood that the optimum design can be attained. Variation in the SHG output power could be restrained when the variation rate $\xi$ was minimum, and accordingly, the optimum values could be obtained. If the length of the respective zones is set to 5 mm and the period $\Lambda_0$ is set to 3.7 μm, optimum values $r_{op}$ of the difference in period between the adjacent zones of the layer domain inverted layer were obtained for the divisional numbers of 2, 3, 4 and 5. The results are shown in FIG. 13.

It was understood that the optimum value $r_{op}$ of the difference in period which is obtained from the figure can be exhibited by the following expression 0.0026 μm<$r_{op}$<0.0032 μm, irrespective of the division number (n). That is, when $\Lambda_0$ and L/n are constant, $r_{op}$ has a constant value.

Figure 14:
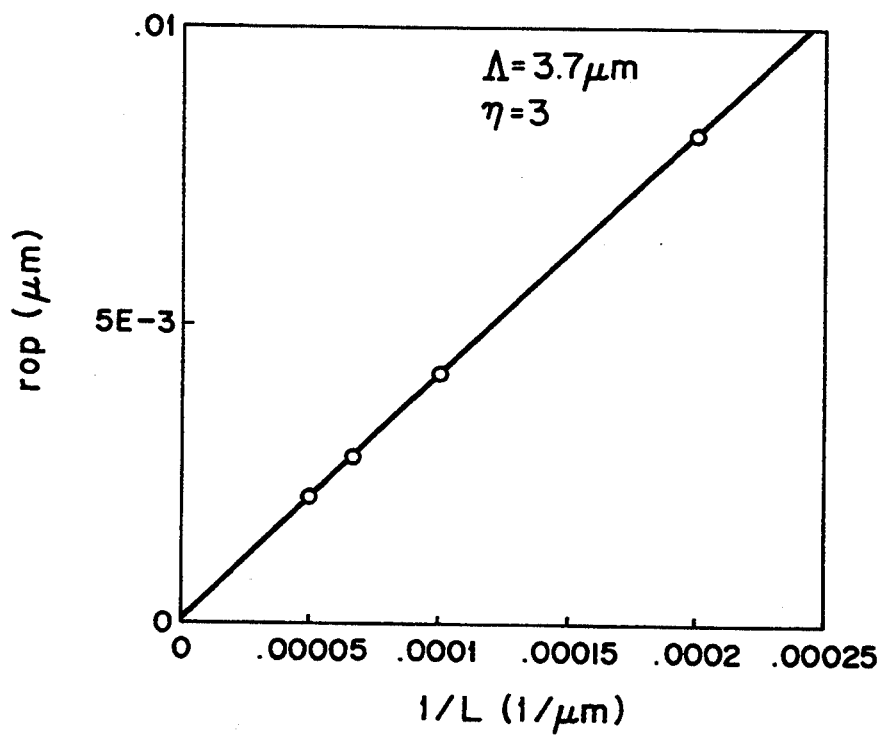
FIG. 14 is a view showing a relationship between 1/element length and an optimum period difference $r_{op}$.

Next the relationship between the zone length L/n and r was obtained. By setting n=3, and by setting the periods of the respective divided zones to $\Lambda_0$, $\Lambda_0+r$ μm, $\Lambda_0+2r$ while $\Lambda_0=3.7$ μm, since n=3 is constant, the relationship between the inversion 1/L of the length of the part in which the domain inverted layer is formed and $r_{op}$ by which the variation rate becomes minimum is shown in FIG. 14. Since $r_{op}$ is proportional to 1/L, it is also proportional to n/L.

Figure 15:
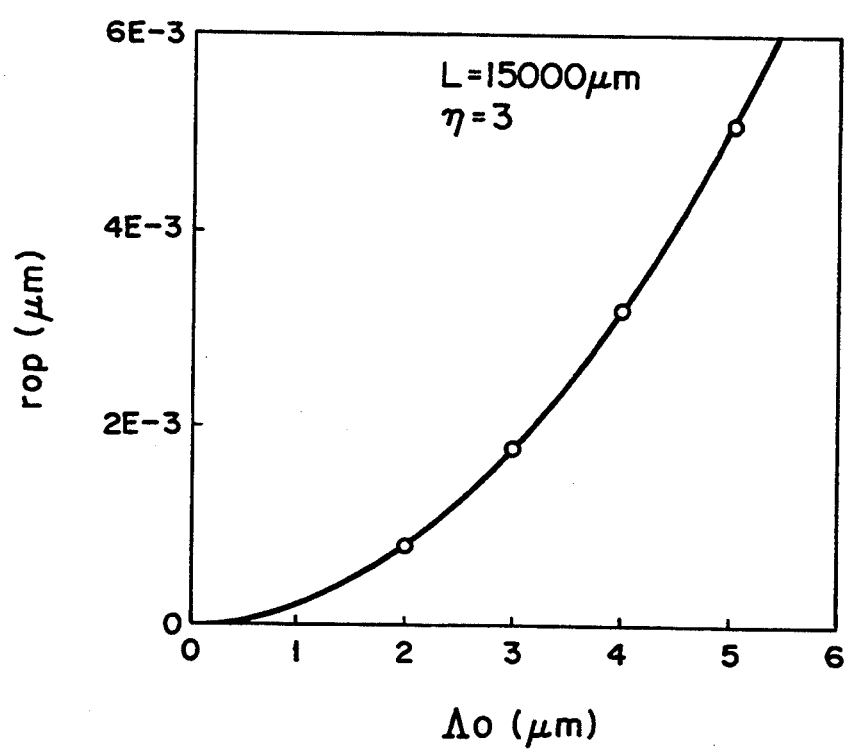
FIG. 15 is a view showing a relationship between an domain inverted period Λ and an optimum period difference $r_{op}$.

Next, the relationship between the period $\Lambda_0$ and $r_{op}$ is obtained when setting is made such as L=15 mm (constant) and n=3, and the result is shown in FIG. 15. From this figure, it is understood that $r_{op}$ is proportional to $\Lambda^2$.

From the results as mentioned above, since $r_{op}$ is proportional to $\Lambda_0^2$ and n/L, the following relationship can be derived, $$r_{op} = A * \Lambda_0^2 * n/L$$

where
  A: constant,
  $\Lambda_0$: period of domain inverted layer
  L: length of a part in which the domain inverted layer is formed,
  n: division number As a result, the range of A in which the wavelength dependency of the SHG output power becomes optimum can be calculated from $\Lambda=3.7$ μm, n=3, L=15,000 μm and 0.0026<$r_{op}$<0.0032 μm, so as to obtain:

$$0.9 < A < 1.2$$

that is, if $$0.9 \times \Lambda_1^2 \times n/L < r_{op} < 1.2 \times \Lambda_1^2 \times n/L \qquad \text{EQ-6}$$

the optimum value can be obtained. From the above-mentioned calculation, the frequency doubler could be optimumly designed.

Figure 16:
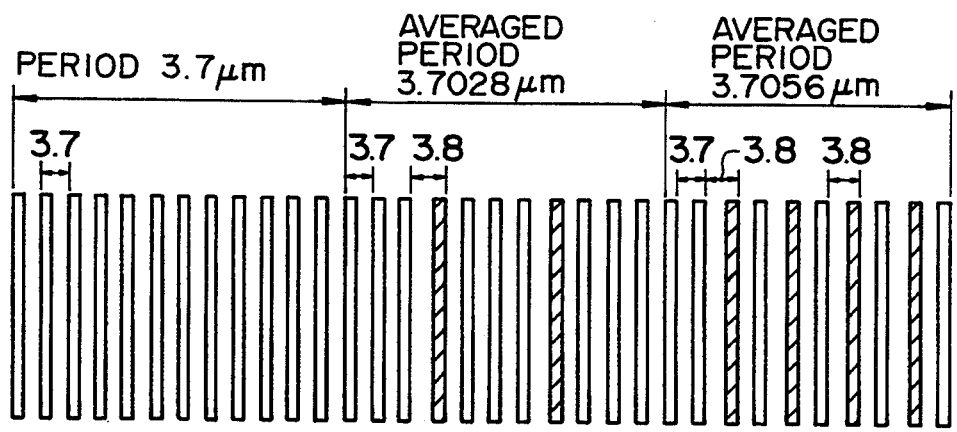
FIG. 16 is a view illustrating a domain inverted structure of a manufactured frequency doubler.
Figure 17:
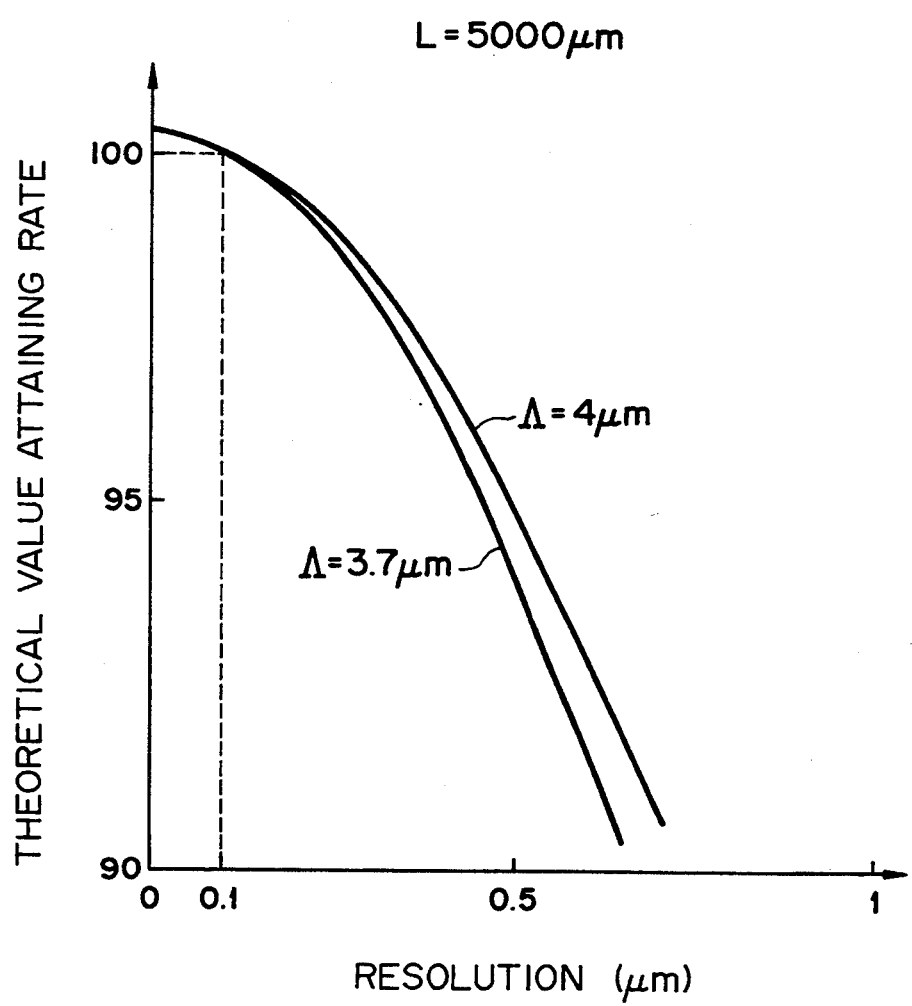
FIG. 17 is a view showing a relationship between minimum dimensions (resolution) for producing a mask and an optimum value.

II Manufacture of Frequency Doubler in Embodiment I
II-1 Design of Mask for Periodic Domain Inverted Layer The periods of a domain inverted type frequency doubler are set to 3.7 μm, 3.7028 μm and 3.7056 μm if the domain inverted layer is divided into three zones. Meanwhile, in order to form the periodic domain inverted layer, a mask for pattering with the use of lithography is required. In general, an electron beam depicting (EB) method is presently used for producing the mask with a high degree of accuracy. However, the minimum dimensions of the mask produced by the above-mentioned method are in general in the order of 0.1 μm (even with the use of a special enlarged exposure device, the value becomes 0.01 μm at a minimum), and accordingly, a mask for a domain inverted layer having a required fine period cannot be produced. Accordingly, a mask as shown in FIG. 16 was designed. For example, in order to practically obtain a period of 3.7028 μm, a period of 3.8 μm is uniformly laid in a period of 3.7 μm so as to practically obtain 3.7028 μm. The relationship between minimum dimensions of the thus produced mask and a theoretical achieving rate is shown in FIG. 17 (the length of the zones is 5,000 μm for periods 4 μm and 3.7 μm). If the minimum dimensions are less than 0.1 μm, a value nearly equal to a theoretical value can be obtained. From the above-mentioned result, with the use of the thus designed mask, the domain inverted type frequency doubler which is obtained through the calculation can be practically obtained.

II-2, Manufacture of Element

Figure 18A:
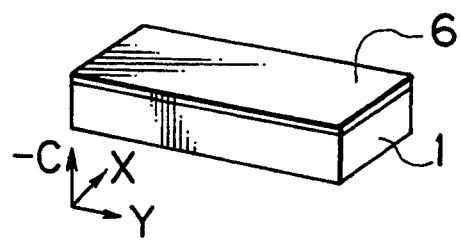
FIGS. 18A to 18H are views showing a method of manufacturing a frequency doubler.
Figure 18B:
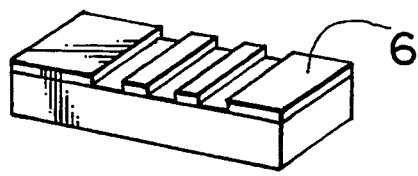
Figure 18C:
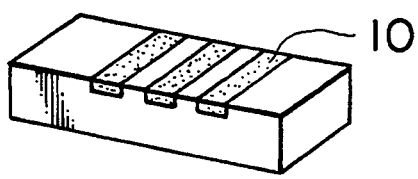
Figure 18D:
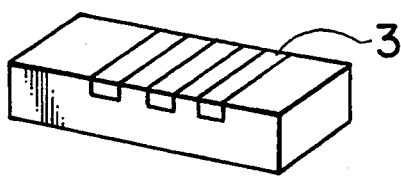
Figure 18E:
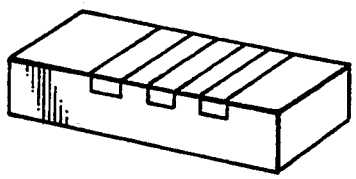
Figure 18F:
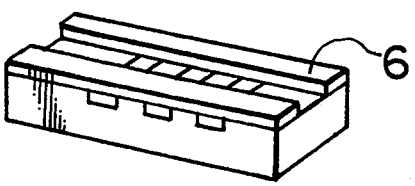
Figure 18G:
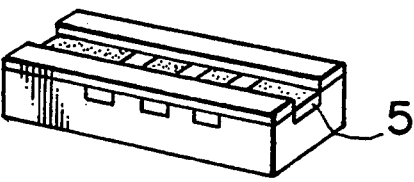
Figure 18H:
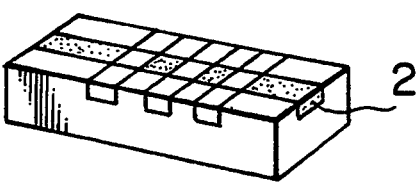
Figure 30:
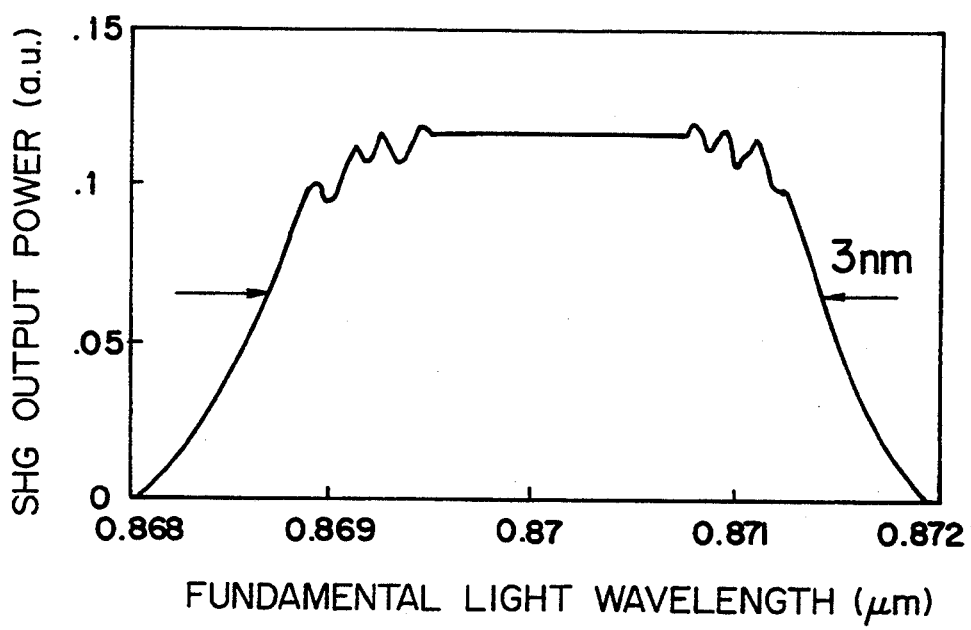
FIG. 30 is a view showing wavelength dependency of SHG light output power.
Figure 31:
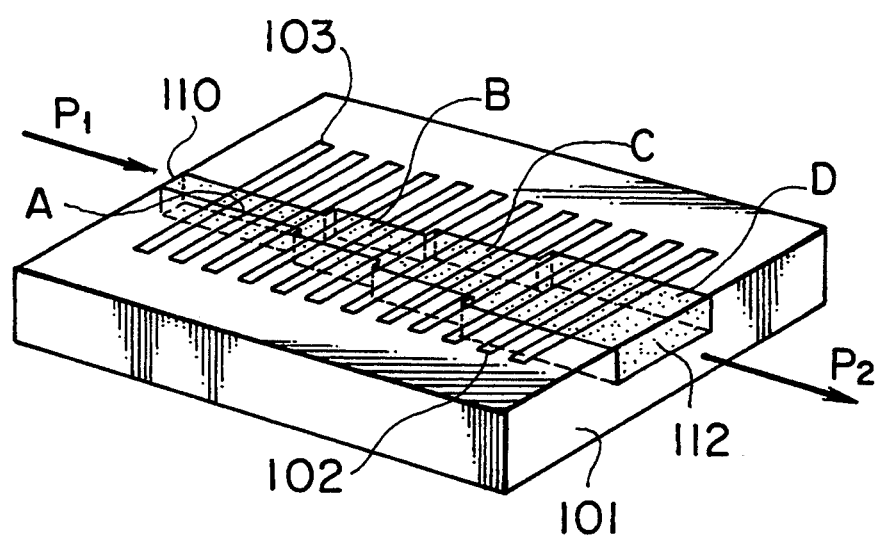
FIG. 31 is a structure view illustrating a conventional frequency doubler.

In order to prove the results of the analysis, the frequency doubler was produced, and the characteristics thereof were measured. That is, with the use of an LiTaO₃ substrate, a frequency doubler shown in FIG. 4 was produced. In this figure, there are shown the LiTaO₃ substrate 1 of −C plate, a proton-exchange wave guide 2, a domain inverted layer 3, a fundamental wave having a wavelength of 840 nm, a second harmonic wave 7 having a wavelength of 420 μm, a zone A including a domain inverted layer having a period of $\Lambda_0$, a zone B including a domain inverted layer having a period of $\Lambda_0+r$, and a zone C including a domain inverted layer of $\Lambda_0+2r$. The lengths $\delta_1$, $\delta_2$ of phase control parts between the zones were set to 0 while setting $\Lambda_0=3.7$ $\mu$m and $r=0.28$ $\mu$m. Next explanation will be made of a method of manufacturing the element with reference to FIGS. 18A through 18H. As shown in FIG. 18A, 30 nm of Ta$_6$ was deposited on the LiTaO$_3$ substrate with the use of a sputtering method. Then, with the use of a photolithographic process, and with the use of the above-mentioned mask for the domain inverted layer, a periodic pattern was formed (FIG. 18B). Then heat-treatment was made in pyrophosphoric acid at a temperature of 260 deg.C. so as to form a proton-exchange layer (FIG. 18C). Then, the substrate was heat-treated at a temperature of 540 deg.C. for 30 sec in an infrared heating unit. The temperature rising rate is set at 80 deg.C./sec. However, if the temperature rising rate is low, the high refractive index layer is undesirably widened. Accordingly, a temperature rising rate of higher than 100 deg.C./min is preferable. After the Ta mask 6 is removed (FIG. 18E), an annealing process was carried out in an atmosphere of oxygen at a temperature of 420 deg.C. for six hours in order to reduce proton remaining in the domain inverted layer. Then, 30 nm of Ta was deposited on the surface of the substrate by a sputtering method (FIG. 18F), and a patterning for the wave guide was made in a direction perpendicular to the domain inverted layer. Proton-exchange was carried out in pyrophosphoric acid at a temperature of 260 deg.C. for 12 min (FIG. 18G). After the mask was removed (FIG. 18H), the substrate was annealed at a temperature of 420 deg.C. for one minute. The opposite end surfaces of the wave guide were optically polished, and 140 nm of SiO$_2$ was deposited on each of the end surfaces so as to form an antireflection film for preventing end surface reflection of guided waves in the wave guide.

II-3. Evaluation of Characteristics

In order to evaluate the characteristics of the thus produced frequency doubler, the frequency doubler was excited by a fundamental wave emitted with the use of a Ti:Al$_2$O$_3$ laser unit which can continuously change the wavelength of laser light in a range of 700 nm band to 900 nm band. The relationship between the fundamental wave and the SHG output power of the produced frequency doubler was measured with the use of the above-mentioned laser. That is, Ti:Al$_2$O$_3$ laser light was inputted, as the fundamental light $P_1$, into one end face of the waveguide in the frequency doubler, and the intensity of the SHG light emitted from the other end face of the waveguide in the frequency doubler was measured.

Figure 19:
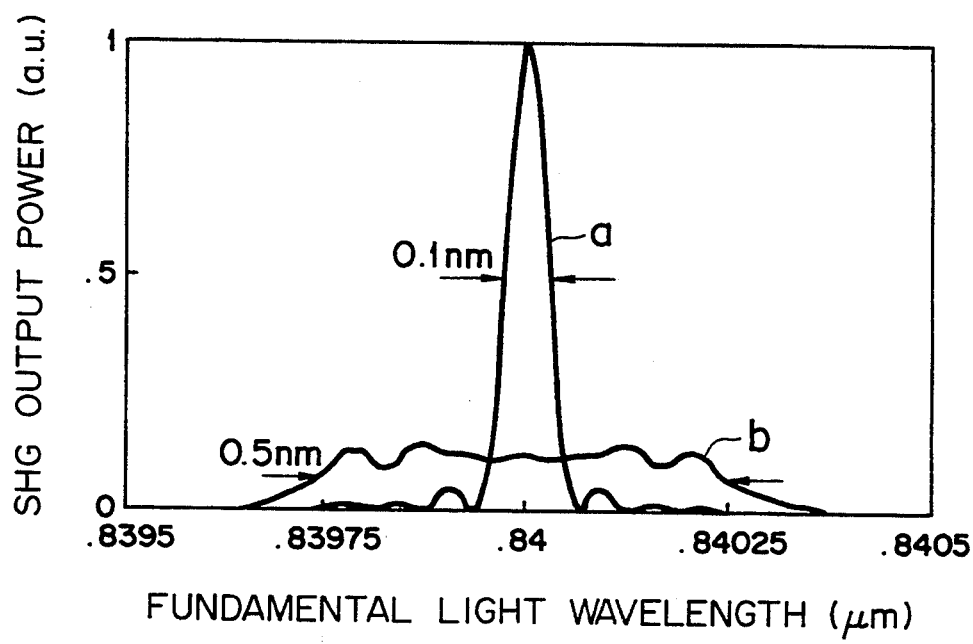
FIG. 19 is a view showing wavelength dependency of SHG light.

In FIG. 19, curve a shows the wavelength dependency of the SHG output power of the frequency doubler as shown in FIG. 1, and FIG. 19 curve b shows that of the frequency doubler shown in FIG. 4 in which the length L of the part in which the domain inverted layer is formed, is L=15 mm, the division number n=3, the period $\Lambda=3.7$ $\mu$m, the value r of difference in domain inverted period between the zones, $r=0.0028$. The domain inverted layer was divided into three zones, and the period of the domain inverted layer in each zone was optimized. Accordingly, it is understood that the wavelength half value width increases from 0.1 nm to 0.5 nm. This result of the measurement is coincident with the result of the analysis as shown in FIG. 9B, which was made for the domain inverted type frequency doubler in the embodiment 1, that is, it has been proved that the design parameters for the frequency doubler, obtained by the analysis are appropriate.

Figure 20:
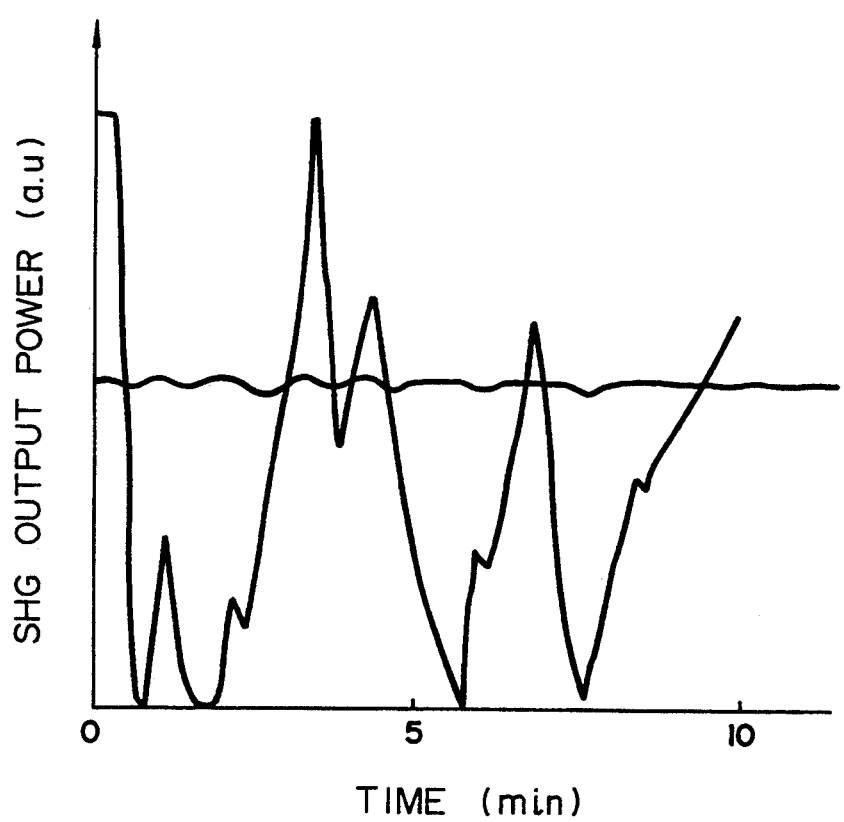
FIG. 20 is a view showing time-dependency of SHG light.

With the results as mentioned above, it was found that a frequency doubler having an optimum structure can be formed in view of the design values obtained by the analysis. Next, with the use of this element, the wavelength conversion of semiconductor laser light was made. That is, the emitted light of the semiconductor laser was inputted, as a fundamental wave, to one end face of the waveguide in the frequency doubler shown in FIG. 4, and the intensity of SHG light $P_2$ emitted from the other end surface of the waveguide was measured. The wavelength of the semiconductor laser varies in dependence upon a variation in temperature, that is, the output wavelength varies by about 0.3 nm as the temperature varies by 1 deg.C. As a result, in the case of the wavelength of light from the semiconductor laser with the use of the frequency doubler shown in FIG. 1, the SHG output power decreased by more than one half if the temperature varied by ±0.1 deg.C., and accordingly, the SHG output power varied as time passed, so that no stable output power could be obtained, as shown in FIG. 20.

Meanwhile, since the frequency doubler manufactured as mentioned above, had an increased wavelength tolerance, the temperature tolerance of the semiconductor laser was increased up to ±0.5 deg.C. which is 5 times as large as that mentioned just before. As a result, as shown in FIG. 21B, even though the wavelength of the semiconductor laser varies due to a variation in temperature, a stable output power was obtained. As mentioned above, the manufactured frequency doubler can satisfactorily withstand temperature variation due to the enlarged wavelength tolerance, and accordingly, a stable SHG output power can be obtained.

Figure 21G:
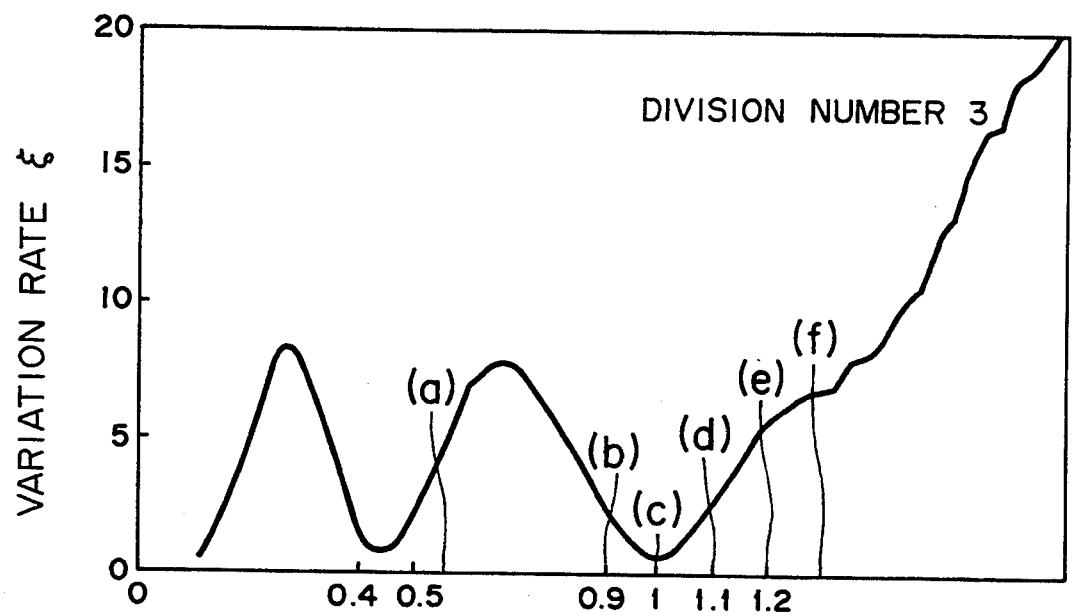

II-4. Relationship between Difference (r) in Period of Domain Inverted Layer and Variation Rate Further, FIG. 21G shows a relationship between the value of A obtained by the expression EQ-5 and the variation rate $\xi$, and a relationship between the fundamental wave and the SHG output power at several variation rates. It can be understood that if the value of A falls in a range of 0.9 to 1.2, the waveform of the SHG output power is satisfactory, but if it is out of the range, the waveform of the SHG output power is distorted, and a stable SHG output power cannot be obtained if the wavelength of the fundamental wave varies. Further, as shown in FIG. 21G, it is understood that if the value of A falls in a range of 0.4 to 0.5, the variation rate is lowered, and accordingly, the waveform of the SHG output can be similarly satisfactory.

Figure 22:
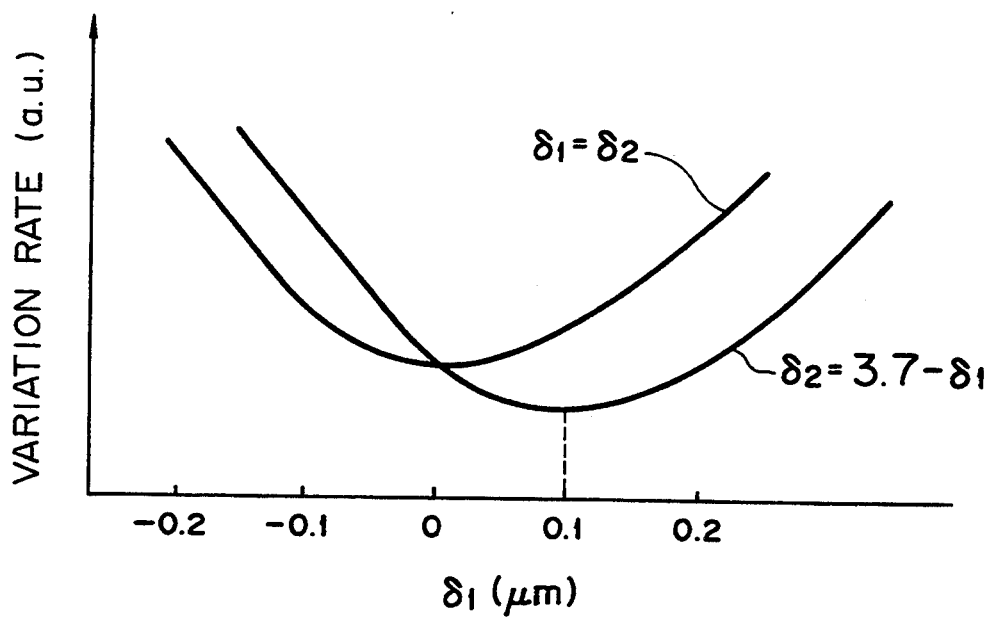
FIG. 22 is a view showing a relationship between a length $\delta_1$ of a phase control part and a variation rate.
Figure 23A:
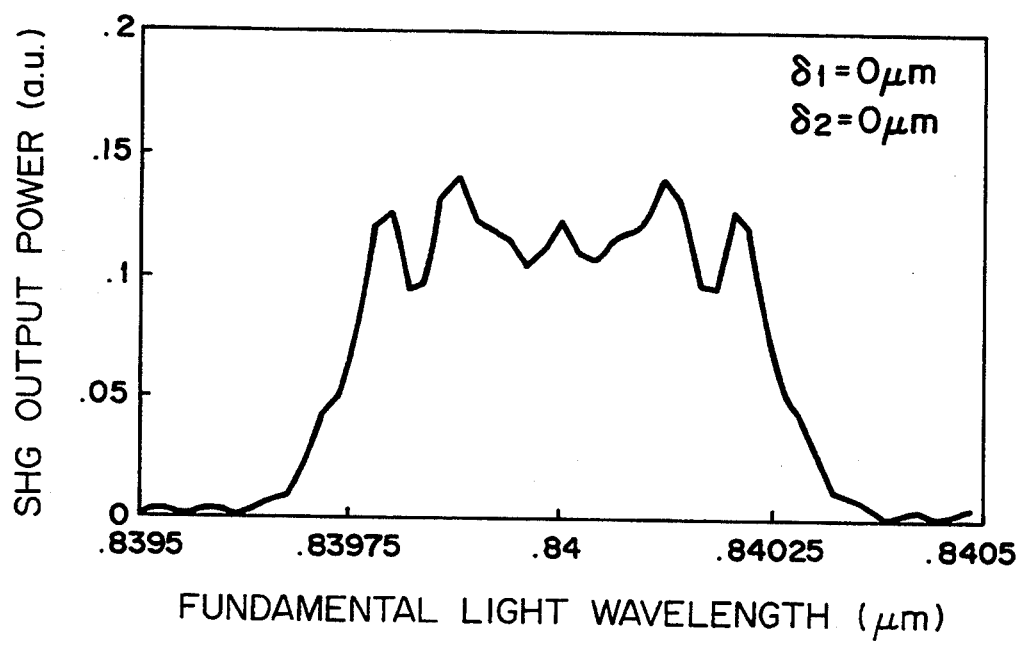
FIGS. 23A and 23B are views showing wavelength dependency of SHG light output power.
Figure 23B:
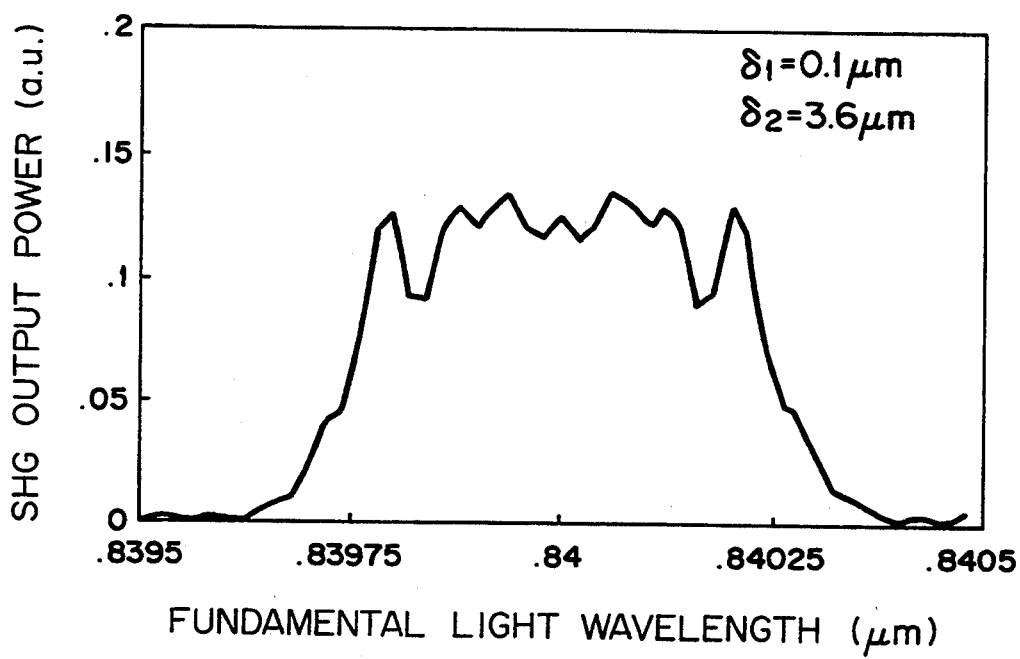
Figure 24:
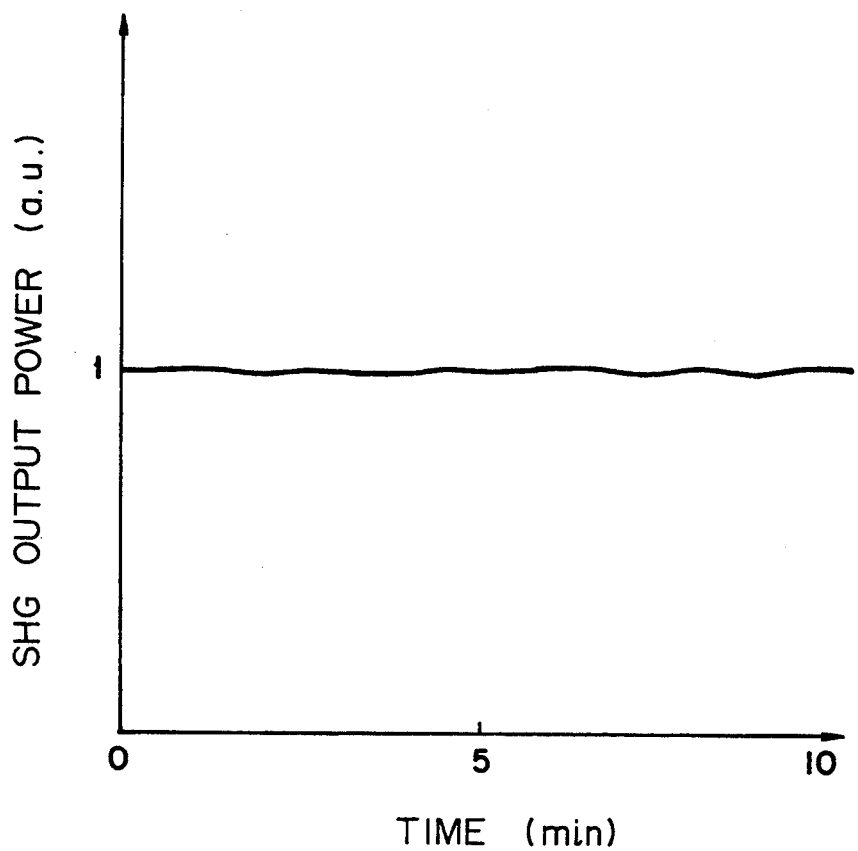
FIG. 24 is a view showing time-dependency of SHG light.

II-5. Relationship between Interzone Gap $\delta$ and Wavelength Dependency of SHG Output Power Explanation has been made hereinabove of the period of the domain inverted layer. Next, the phase control parts, that is, the gaps $\delta$ interposed between the zones will be hereinbelow detailed. In order to stabilize the SHG output power with respect variations in the wavelength of input light, it is required that the wavelength dependency of the SHG output power is shaped so as to have a smooth form in order to lower the variation rate. Accordingly, it is necessary to optimize the interference between SHG output powers produced in the respective divided zones. Accordingly, parts in which the phases of the SHG output powers are controlled were arranged between the divided zones in order to control the interference between SHG output powers produced in the divided zones, and accordingly, the phases of the SHG output powers were controlled. With the use of the expressions EQ-3 and EQ-4, the relationship of the gap δ between the zones with respect to the variation rate can be calculated. In this case, setting was made as the element length=15,000 μm, the division number=3, the period $\Lambda_0=3.7$ μm, $\Lambda_0+r=3.7028$, $\Lambda_0+2r=3.7056$, and phase control parts having lengths $\delta_1$, $\delta_2$ were provided between the zones. The relationship between the values of $\delta_1$, $\delta_2$ and the variation rate of the SHG output was obtained. The results thereof are shown in FIG. 22. If $\delta_1=0.1$ μm and $\delta_2=3.6$ μm, the variation rate becomes lowest, and accordingly, it was understood that the optimum condition can be obtained. With the use of this result, the frequency doubler shown in FIG. 4 was produced, and then the characteristics thereof were measured. The wavelength dependency of the SHG output power obtained by this element is given in FIGS. 23A to 23b. FIG. 23A shows the characteristics when $\delta_1=\delta_2=0$ that is, when no gaps δ are present between the zones. Further, FIG. 23B shows the characteristics when $\delta_1=0.1$ μm and $\delta_2=3.6$ μm. Accordingly, with the frequency doubler incorporating the phase control parts, it is understood from FIG. 23B that the variation rate is lowered in comparison with the frequency doubler shown in FIG. 23A, and accordingly, variations in the SHG output power are small around the maximum value of the output power so that a smooth waveform is obtained. With the use of the produced frequency doubler, the wavelength conversion of the semiconductor later was carried out. FIG. 24 shows a time dependency of the SHG output power. With the provision of the phase control parts, the stability with respect to variations in the wavelength of the semiconductor laser caused by variations in temperature is enhanced, and accordingly, an extremely stable SHG output power was obtained.

It is noted that the relationship between the variation rate ξ and δ is periodical so that the identical relationship is given in every period Λ of the domain inverted layer. Thus, similar characteristics could be obtained from such an arrangement as $\delta_1=0.1$ μm $+m_1*\Lambda$, $\delta_2=-0.1+m_2*\Lambda$ ($\Lambda=3.7$ μm, $m_1=1, 2, 3, \ldots, m_2=1, 2, 3, \ldots$).

Embodiment 2

It has been explained in the embodiment 1 that in the frequency doubler composed of a periodical domain inverted layer, the domain inverted layer is divided into more than two zones respectively consisting of domain inverted layers having different periods so that phase matching wavelengths in the respective zones are different from one another bit by bit. As a result, the tolerance of the phase matching wavelength in each zone was increased.

Meanwhile, in the embodiment 2, in a frequency doubler composed of a periodic domain inverted layer, similar to that in the embodiment 1, the period of the domain inverted layer is uniform throughout the entire element, but the propagation constant of the waveguide is changed in order to increase the wavelength tolerance of the frequency doubler. That is, the waveguide is divided into more than two zones having different widths so as to respectively have different light propagation constants. As a result, the phase matching wavelengths in the respective zones differ from one another bit by bit, and accordingly, an effect similar to that obtained in the embodiment 1 can be obtained so that the tolerance of the phase matching wavelength for the frequency doubler can be increased.

III. Theoretical Analysis

The enhancement of the tolerance of the domain inverted type frequency doubler in the embodiment 2 in which the propagation constant of the waveguide is changed was studied. The effect of increasing the tolerance of the phase matching wavelength in the frequency doubler explained in the embodiment 1 can be also obtained with the frequency doubler in the embodiment 2. The relationship between the domain inverted period Λ and the effective refractive index of the waveguide and as well as the phase matching wavelength λ are given by the following expression in view of the expression EQ-1

$$\Lambda=2\pi/\Delta k=\lambda/2(N_{2\omega}(\lambda)-N_{\omega}(\lambda)) \qquad \text{EQ-7}$$

where

Λ: period of domain inverted layer

λ: phase matching wavelength $N_{2\omega}(\lambda)$: effective refractive index for SHG light $N_{\omega}(\lambda)$: effective refractive index for fundamental wave light.

Making the domain inverted periods Λ of the divided zones different from each other corresponds to changing the values of $N_{\omega}(\lambda)$ and $N_{2\omega}(\lambda)$ and the phase matching wavelength in order to maintain the relationship given by the equation EQ-1, that is, to alter the phase matching wavelengths. If the phase matching wavelengths in the respective zones are different from one another, the tolerance of phase matching wavelength is increased.

Similar effects can be obtained by changing the relationship between the effective refractive indices $N_{\omega}(\lambda)$, $N_{2\omega}(\lambda)$ and the phase matching wavelength. For example, the dependency of $N_{2\omega}(\lambda)-N_{\omega}(\lambda)$ with respect to the phase matching wavelength λ varies if the width of the waveguide is changed. Accordingly, in order to maintain the relationship given by the expression EQ-6 under such a condition as Λ=constant, the phase matching wavelength λ has to be changed. As a result, if the waveguide is divided into more than two zones respectively having different widths, phase matching wavelengths in the zones can be made to be different from each other without changing the domain inverted period, that is, the effects completely the same as that obtained by changing Λ can be obtained. Accordingly, by substituting the condition given by the expression EQ-5 with the effective refractive indices, the following relationship can be obtained:

$$\beta_m = \lambda_m/2/(N_{2\infty}(\lambda_m) - N_{\infty}(\lambda_m)) \qquad \text{EQ-8}$$
$$\beta_{m-1} = \lambda_m/2/(N_{2\infty}(\lambda_{m-1}) - N_{\infty}(\lambda_{m-1}))$$
$$0.9 \times \beta_m^2 \times n/L < \beta_{m-1} - \beta_m < 1.2 \times \beta_m^2 \times n/L$$
$$(m = 2, 3, \ldots)$$

where $\lambda_m$ (m=1, 2 ... n): phase matching wavelength in each zone of the waveguide which is divided into n zones;

$N_{\omega}(\lambda_m)$ (m=1, 2, 3, ... n): effective index for fundamental wave;

$N_{2\omega}(\lambda_m)$ (m=1, 2, 3, ... n): effective index for SHG light.

Thus, with the use of the above-mentioned relational expressions, a frequency doubler having a wide wavelength tolerance can be designed.

IV. Production and Evaluation of Frequency Doubler in Embodiment 2

Figure 25:
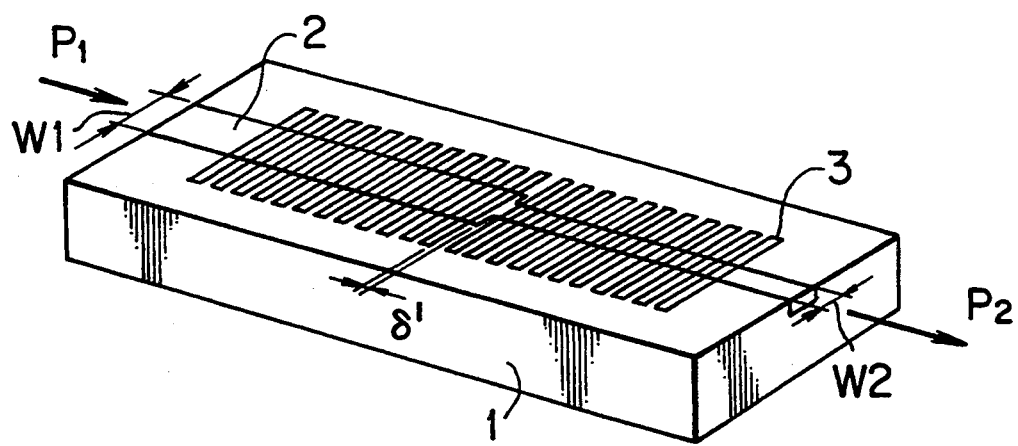
FIG. 25 is a structure view illustrating a frequency doubler in a second embodiment.
Figure 26:
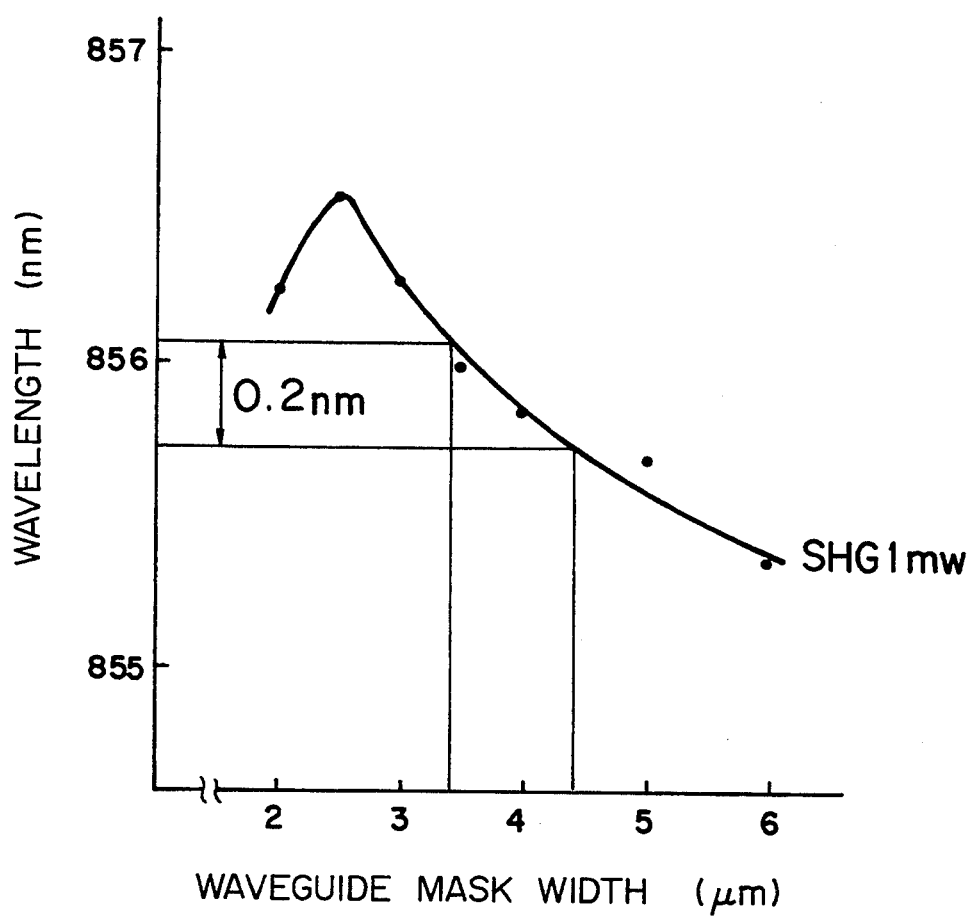
FIG. 26 is a view showing a relationship between a waveguide width and a phase matching wavelength.
Figure 27:
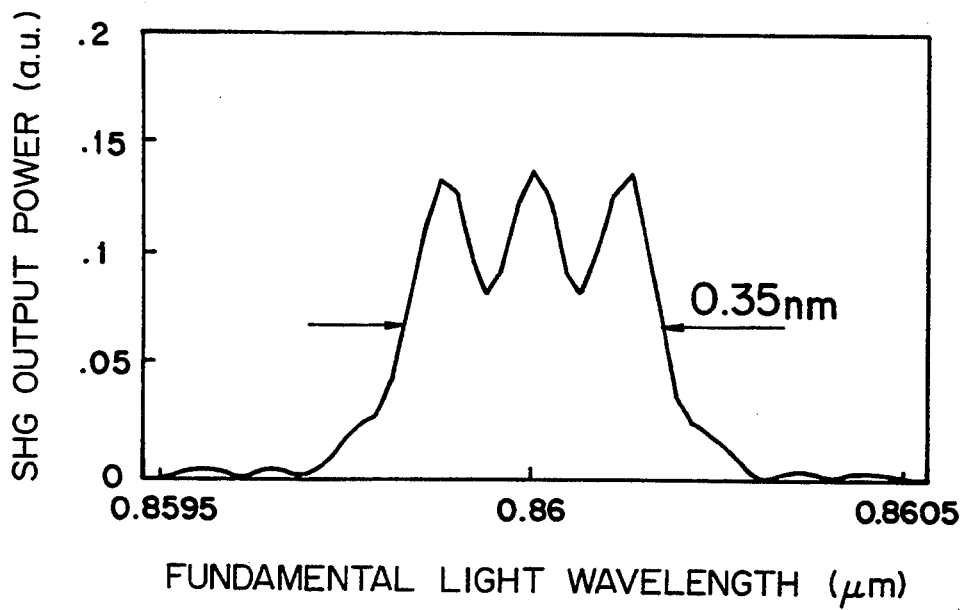
FIG. 27 is a view showing wavelength dependency of SHG light.

Explanation will be made in detail hereinbelow of the frequency doubler in the embodiment 2 with reference to FIG. 25. In FIG. 25 which is a schematic view illustrating the frequency doubler in the embodiment 2, there are shown an LiTaO$_3$ substrate 1 of −C plate, a proton exchange waveguide 2, a domain inverted layer 3, a fundamental wave P$_1$ having a wavelength of 860 nm and a second harmonic wave P$_2$ having a wavelength of 430 nm. The waveguide is composed of two parts respectively having widths W$_1$=3.4 μm, W$_2$=4.4 μm, and a part having a width which varies from W$_1$ to W$_2$ and a gap δ' between the waveguide and the domain inverted layer. If the width of the waveguide is changed the effective refractive index for light propagating through the waveguide is changed so that the phase matching wavelengths of the fundamental wave and the SHG light which propagates through the waveguide are changed. The distance δ between the zones between which the phase of the SHG light is controlled as explained in the embodiment 1, can be also materialized by the distance δ' between the parts having different widths and the domain inverted layer. In order to obtain the relationship between the width of the waveguide and the phase matching wavelength, a relationship between the width of the waveguide and the phase matching wavelength is obtained when the period of the domain inverted layer is 4.0 μm. The results shown in FIG. 27. With the use of Expressions EQ-7 and EQ-8, by setting such as the value of $\beta_{m-1}-\beta_m=1$, the division number=2, the length of the part in which the domain inverted layer is formed=1,000 μm, and the period=4.0 μm, λ$_2$−λ$_1$=0.2 nm, it can be found that the widths of the waveguide which satisfy the above-mentioned relationship are 3.4 μm and 4.4 μm. Accordingly, the waveguide widths of the frequency doubler shown in FIG. 25 were set to W$_1$=3.4 μm and W$_2$=4.4 μm, and the characteristics were measured in such a case that the waveguide width is changed at the center of the frequency doubler. The fundamental wave was introduced into the produced frequency doubler, and the relationship between the wavelength of the fundamental wave and the wavelength of the SHG light was obtained. The result is shown in FIG. 27. It is found that the wavelength tolerance can be enlarged, and the frequency doubler which can stably operate can be practically obtained. It is noted that the value of δ' is zero so as give an optimum value if the division number is 2. Accordingly, during the formation of the waveguide, it was required to positionally align the waveguide with the domain inverted layer.

Further, the propagation coefficient of the waveguide can be easily changed by changing the depth of the waveguide. The waveguide is divided into two parts so as to satisfy the expression EQ-8, and the effective indices in the respective parts are made to be different from each other by altering the depths of the parts, thereby it is possible to enlarge the wavelength tolerance.

Further, the light propagation coefficient can be also changed by forming a clad layer on the outer surface of the domain inverted layer. Further, the effective refractive index of the waveguide can be controlled in accordance with a refractive index or a thickness of the clad layer. Further, if the waveguide is divided into parts so as to satisfy the expression EQ-8, and the effective refractive indices are made to be different from each other, similar effects can be obtained, thereby it is possible to enlarge the wavelength tolerance.

Although explanation has been made herein below with the use of the embodiments 1, 2 in which LiTaO$_3$ is used as nonlinear crystal, the present invention can also be applied to LiNbO$_3$ and mixed crystal of LiTaO$_3$ and LiNbO$_3$. That is, since LiNbO$_3$ or mixed crystal of LiTaO$_3$ and LiNbO$_3$ has a high non linear optical constant, the use of them can form a highly efficient frequency doubler.

Further, feroelectric materials such as KNbO$_3$, KTB may be substituted for LiTaO$_3$ in the embodiments 1, 2. Since these feroelectric materials have a high nonlinear optical constant, and further are excellent in optical damage resistance, a frequency doubler having a higher degree of efficiency and a high output power can be practically obtained.

Further, organic materials such as MNA or organic polymer may be substituted for LiTaO$_3$ in the embodiments 1, 2. With the use of the organic materials the mass productivity of frequency doublers becomes excellent. Further, since these materials have a high nonlinear optical constant, and further are excellent in optical damage resistance, a frequency doubler having a higher degree of efficiency and a high output power can be practically obtained.

Further, a waveguide which can propagate light therethrough, such as a Ti diffused waveguide, an Nb diffused waveguide or an Nd diffused waveguide can be substituted for the proton exchange layer as the waveguide in the embodiments 1, 2. Since such a waveguide has a small waveguide loss, a frequency doubler having a high degree of efficiency can be practically obtained.

Embodiment 3

Figure 28:
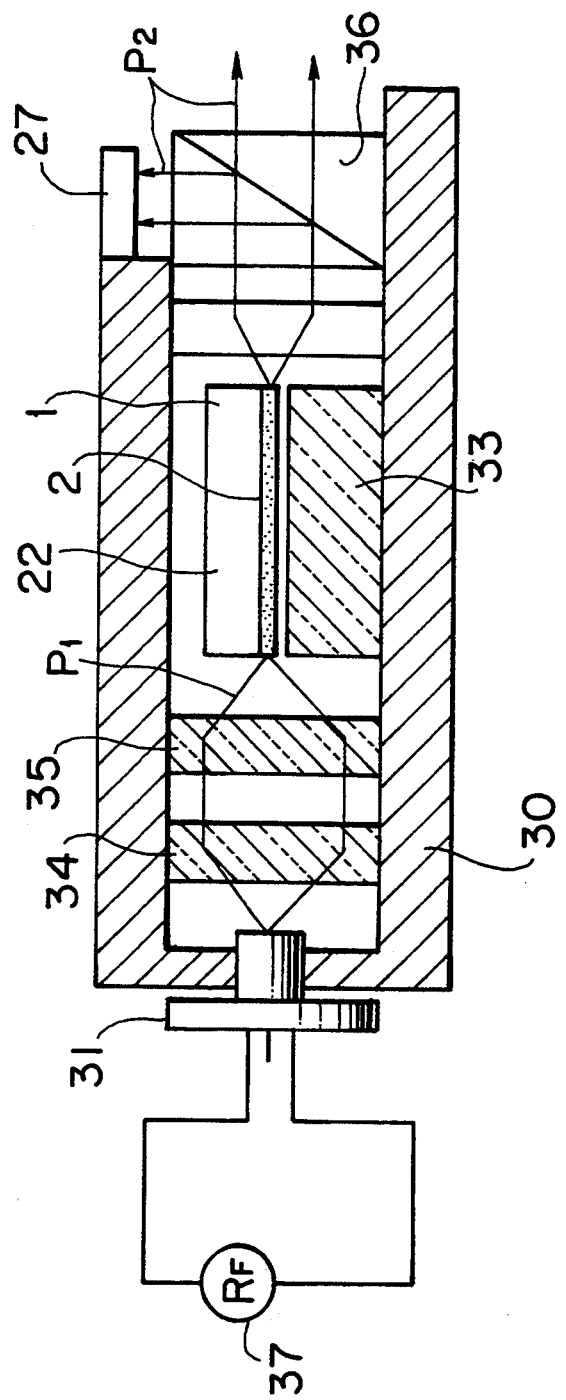
FIG. 28 is a schematic view illustrating a laser light source in a third embodiment.

FIG. 28 is a schematic view illustrating a laser source using a frequency doubler in an embodiment 3 of the present invention. The laser source is basically composed of a semiconductor laser 31, a frequency doubler 22 and an RF power source 37. A fundamental wave P$_1$ emitted from the semiconductor laser 31 is converted into a parallel ray beam by means of a collimator lens 34, and thereafter, is introduced by means of a focusing lens 35 into a waveguide 2 on the frequency doubler 22 through which it is converted into a harmonic wave P$_2$. The configuration of the frequency doubler is similar to that explained in the embodiment 1. In this embodiment, the laser source was materialized in combination of the frequency doubler and the semiconductor laser. In this laser source, the semiconductor laser was driven by an RF power source 37 which is a power source for directly modulating a current fed to the semiconductor laser 31, into a high frequency wave.

Figure 29:
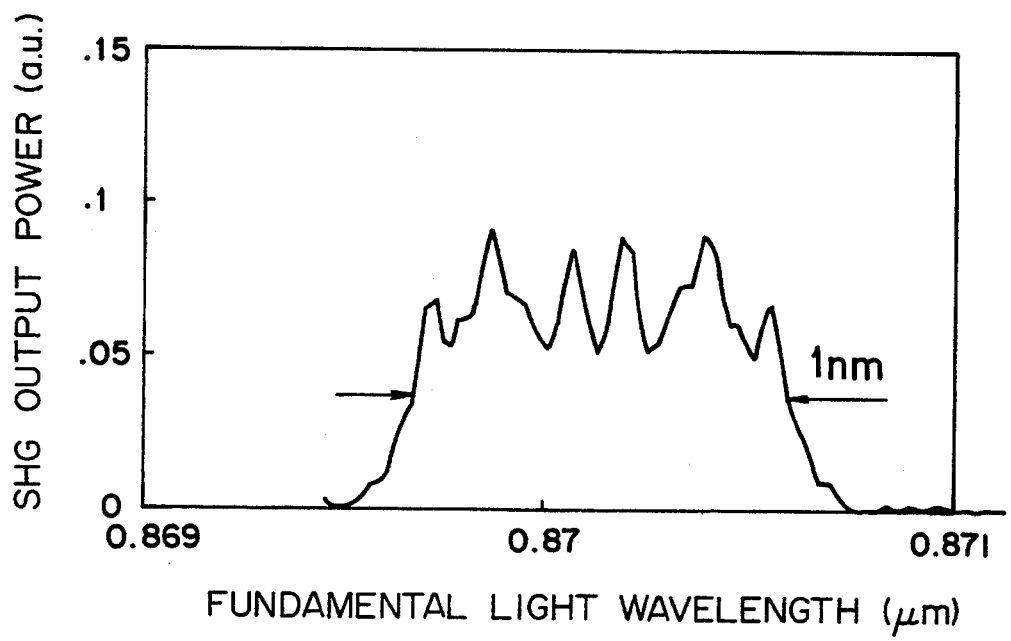
FIG. 29 is a view showing wavelength dependency of SHG light.

The spectrum of semiconductor laser light is a single spectrum having less than 0.1 nm before modulation, but becomes multi-spectra if it is modulated with a frequency of 1 GHz so as to be widened up to 1 nm. Accordingly, the tolerance of the frequency doubler is designed to 1 nm. Setting is made such as the length of the element=15,000 μm, the division number=4, and periods=4.0, 4.0044 4.0088 and 4.0132 μm. A relationship between the wavelength of the fundamental wave and the SHG output power is shown in FIG. 29. Since the frequency doubler has a wide wavelength tolerance, that is, 1 nm, a stable modulating characteristic can be obtained. Further, the SFG characteristic of the frequency doubler varies around the maximum value as shown in FIG. 29. However, since the wavelength half value width of the phase matching wavelength is widened to 1 nm, variations in the SHG characteristic are integrated. Thus, variations in the SHG output power is extremely small even though the wavelength of the fundamental wave varies, and accordingly, a smooth characteristic can be obtained. As a result, it is possible to practically obtain a visible laser source which is extremely stable against variations in temperature.

As mentioned above, the frequency doubler according to the present invention, can enhance the wavelength tolerance so that a stable harmonic wave can be obtained. Further, in the combination of the frequency doubler according to the present invention and a semiconductor laser, a visible laser source which is stable against variations in temperature can be practically materialized.

What is claimed is:

1. A frequency doubler comprising:
   (a) a nonlinear optical crystal substrate through which light having a phase is transmitted in a light transmitting direction; and
   (b) a periodic domain inverted layer in said nonlinear optical crystal substrate, said periodic domain inverted layer comprising:
      (i) at least two zones in which a domain of said periodic domain inverted layer is periodically inverted at different periods of domain inversion in said light transmitting direction; and
      (ii) means for modulating the phase of said light, provided between adjacent ones of said zones where the periods of domain inversion are different from one another.

2. A frequency doubler comprising:
   (a) a nonlinear optical crystal substrate;
   (b) a wave guide formed on said nonlinear optical crystal substrate along a light transmitting direction, the wave guide having at least two parts separated along the light transmitting direction and having different propagation constants;
   (c) a periodic domain inverted layer formed to extend at least partially into said wave guide; and
   (d) means for modulating a phase of light transmitted through said wave guide, said means for modulating being provided between adjacent ones of said parts where the propagation constants are different from one another.

3. A frequency doubler as set forth in claim 1, wherein said nonlinear optical crystal substrate is made of a mixed crystal of $LiTaO_3$ and $LiNbO_3$.

4. A frequency doubler as set forth in claim 1, wherein a wave guide is formed of a proton exchange layer in said nonlinear optical crystal substrate, said periodic domain inverted layer extending along said wave guide.

5. A frequency doubler as set forth in claim 2, wherein the waveguide has a width which discretely varies in a light propagation direction.

6. A frequency doubler as set forth in claim 2, wherein the waveguide has a thickness which discretely varies in a light propagation direction.

7. A laser source in combination of a frequency doubler claimed in claim 1, and a semiconductor laser.

8. A laser source as set forth in claim 7, wherein a high frequency wave is superposed with a drive current for the semiconductor laser.

9. A frequency doubler as set forth in claim 2, wherein said nonlinear optical crystal substrate is made of a mixed crystal of $LiTaO_3$ and $LiNbO_3$.

10. A laser source in combination of a frequency doubler claimed in claim 2, and a semiconductor laser.

11. A laser source as set forth in claim 10, wherein a high frequency wave is superposed with a drive current for the semiconductor laser.

12. A frequency doubler as set forth in claim 1, wherein said means for modulating the phase of said light comprises a gap between said adjacent ones of said zones.

13. A frequency doubler as set forth in claim 2, wherein said means for modulating the phase of said light comprises a gap between said adjacent ones of said zones.

14. A frequency doubler comprising:
   a nonlinear optical crystal substrate; and
   a periodic domain inverted layer which is formed so as to extend in a part of said nonlinear optical crystal substrate, said periodic domain inverted layer comprising a plurality of zones, each of said plurality of zones having a domain inverted period selected so that said domain inverted period of each of said plurality of zones satisfies the following relationship:

$$0.9\, \Lambda_p^2\, n/L < r_{op} < 1.2\, \Lambda_p^2\, n/L$$

or $$0.4\, \Lambda_p^2\, n/L < r_{op} < 0.5\, \Lambda_p^2\, n/L$$

wherein $\Lambda_p$ (p = 1, 2, 3, ... n−1) is the domain inverted period of a zone p of said plurality of zones, n is a number of said plurality of zones, L is a length of said part of said nonlinear optical crystal substrate, and $r_{op} = \Lambda_p - \Lambda_{p-1}$.

15. A frequency doubler for receiving light comprising a fundamental wave and outputting SHG light in response to said fundamental wave, said frequency doubler comprising:
   a nonlinear optical crystal substrate;
   a wave guide formed in said nonlinear optical crystal substrate; and
   a periodic domain inverted layer formed in said wave guide along said wave guide, said wave guide comprising a plurality of zones, each of said plurality of zones having a phase matching wavelength selected so that said phase matching wavelength of each of said plurality of zones satisfies the following condition:

$$0.9\, \beta_m^2\, n/L < \beta_m - \beta_{m-1} < 1.2\, \beta_m^2\, n/L$$

or $$0.4\, \beta_m^2\, n/L < \beta_m - \beta_{m-1} < 0.5\, \beta_m^2\, n/L$$

where $\beta_m (m = 2, 3, \ldots n) = \lambda_m/2\, \{N_{2\omega}(\lambda_m) - N_\omega(\lambda_m)\}$;

$\beta_{m-1} (m = 2, 3, \ldots n) = \lambda_{m-1}/2\{N_{2\omega}(\lambda_{m-1}) - N_\omega(\lambda_{m-1})\}$;

$\lambda_m$ (m = 1, 2, 3, ... n) is said phase matching wavelength of said each of said zones;

$N_\omega(\lambda_m)$ (m = 1, 2, 3, ... n) is an effective index of said each of said zones for said fundamental wave;

$N_{2\omega}(\lambda_m)$ (m = 1, 2, 3, ... n) is an effective index of said each of said zones for said SHG light;

n is a number of said plurality of zones; and

L is a length of the wave guide.

16. A frequency doubler as set forth in claim 14, wherein a part for modulating a phase of light is provided between the zones in which the domain inverted layer has different periods.

17. A frequency doubler as set forth in claim 15, wherein a part for modulating a phase of light is provided between zones in which the waveguide has different effective refractive indices.

18. A frequency doubler as set forth in claim 14, wherein said nonlinear optical crystal substrate is made of a mixed crystal of $LiTaO_3$ and $LiNbO_3$.

19. A frequency doubler as set forth in claim 15, wherein said nonlinear optical crystal substrate is made of a mixed crystal of $LiTaO_3$ and $LiNbO_3$.

20. A frequency doubler as set forth in claim 2, wherein said waveguide is formed of a proton exchange layer.

21. A frequency doubler as set forth in claim 14, wherein a wave guide is formed of a proton exchange layer in said nonlinear optical crystal substrate, said periodic domain inverted layer extending along said wave guide.

22. A frequency doubler as set forth in claim 15, wherein said waveguide is formed of a proton exchange layer.

23. A frequency doubler as set forth in claim 14, wherein a wave guide is formed in said nonlinear optical crystal substrate, said periodic domain inverted layer is formed along said wave guide, and said wave guide has a width which discretely varies in a light propagation direction.

24. A frequency doubler as set forth in claim 15, wherein the waveguide has a width which discretely varies in a light propagation direction.

25. A frequency doubler as set forth in claim 14, wherein a wave guide is formed in said nonlinear optical crystal substrate, said periodic domain inverted layer is formed along said wave guide, and said wave guide has a thickness which discretely varies in a light propagation direction.

26. A frequency doubler as set forth in claim 15, wherein the waveguide has a thickness which discretely varies in a light propagation direction.

27. A laser source in combination of a frequency doubler claimed in claim 14, and a semiconductor laser.

28. A laser source in combination of a frequency doubler claimed in claim 15, and a semiconductor laser.

29. A laser source as set forth in claim 27, wherein a high frequency wave is superposed with a drive current for the semiconductor laser.

30. A laser source as set forth in claim 28, wherein a high frequency wave is superposed with a drive current for the semiconductor laser.

31. A frequency doubler as set forth in claim 14, wherein said plurality of zones have equal lengths.

32. A frequency doubler as set forth in claim 15, wherein said plurality of zones have equal lengths.

33. A frequency doubler as set forth in claim 16, wherein said part for modulating the phase of said light comprises a gap between the zones in which the domain inverted layer has different periods.

34. A frequency doubler as set forth in claim 17, wherein said part for modulating the phase of said light comprises a gap between said zones in which said wave guide has different effective refractive indices.

* * * * *